(12) United States Patent
Kodaira et al.

(10) Patent No.: US 6,233,059 B1
(45) Date of Patent: May 15, 2001

(54) SCANNER DEVICE AND CONTROL METHOD THEREOF, AND IMAGE INPUT SYSTEM

(75) Inventors: Takanori Kodaira; Yohei Izumi, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/025,398

(22) Filed: Feb. 18, 1998

(30) Foreign Application Priority Data

Feb. 19, 1997 (JP) .................................................. 9-035059
Feb. 19, 1997 (JP) .................................................. 9-035361

(51) Int. Cl.⁷ .................................................. G06K 15/00
(52) U.S. Cl. ........................................ 358/1.9; 358/487
(58) Field of Search .................... 358/494, 496, 358/498, 497, 487, 506, 1.9

(56) References Cited

U.S. PATENT DOCUMENTS

| | | | |
|---|---|---|---|
| 5,337,164 | * 8/1994 | Yabe et al. | 358/487 |
| 5,414,535 | 5/1995 | Kanmoto et al. | 358/487 |
| 5,416,605 | * 5/1995 | Hideshima et al. | 358/487 |
| 5,568,273 | * 10/1996 | Sato et al. | 358/494 |
| 5,633,733 | * 5/1997 | Miyazawa | 358/487 |
| 5,751,451 | * 5/1998 | Ogoshi et al. | 358/527 |
| 5,754,314 | * 5/1998 | Araki et al. | 358/487 |

FOREIGN PATENT DOCUMENTS

| | | |
|---|---|---|
| 0 363 988 | 4/1990 | (EP) . |
| 0 464 527 | 1/1992 | (EP) . |
| 0 488 176 A2 | 6/1992 | (EP) . |
| 0 804 013 A2 | 10/1997 | (EP) . |
| 5-145838 | 6/1993 | (JP) . |

* cited by examiner

Primary Examiner—Jerome Grant, II
(74) Attorney, Agent, or Firm—Morgan & Finnegan LLP

(57) ABSTRACT

In order to accurately perform correction of focal distance and color of film before pre-scanning, the image at the generally center area of the first frame of film is read in a first pre-scan, auto-focusing and judgment between negative/positive is made, exposure parameters are set in a second pre-scanning, and the image is read in main scanning.

10 Claims, 31 Drawing Sheets

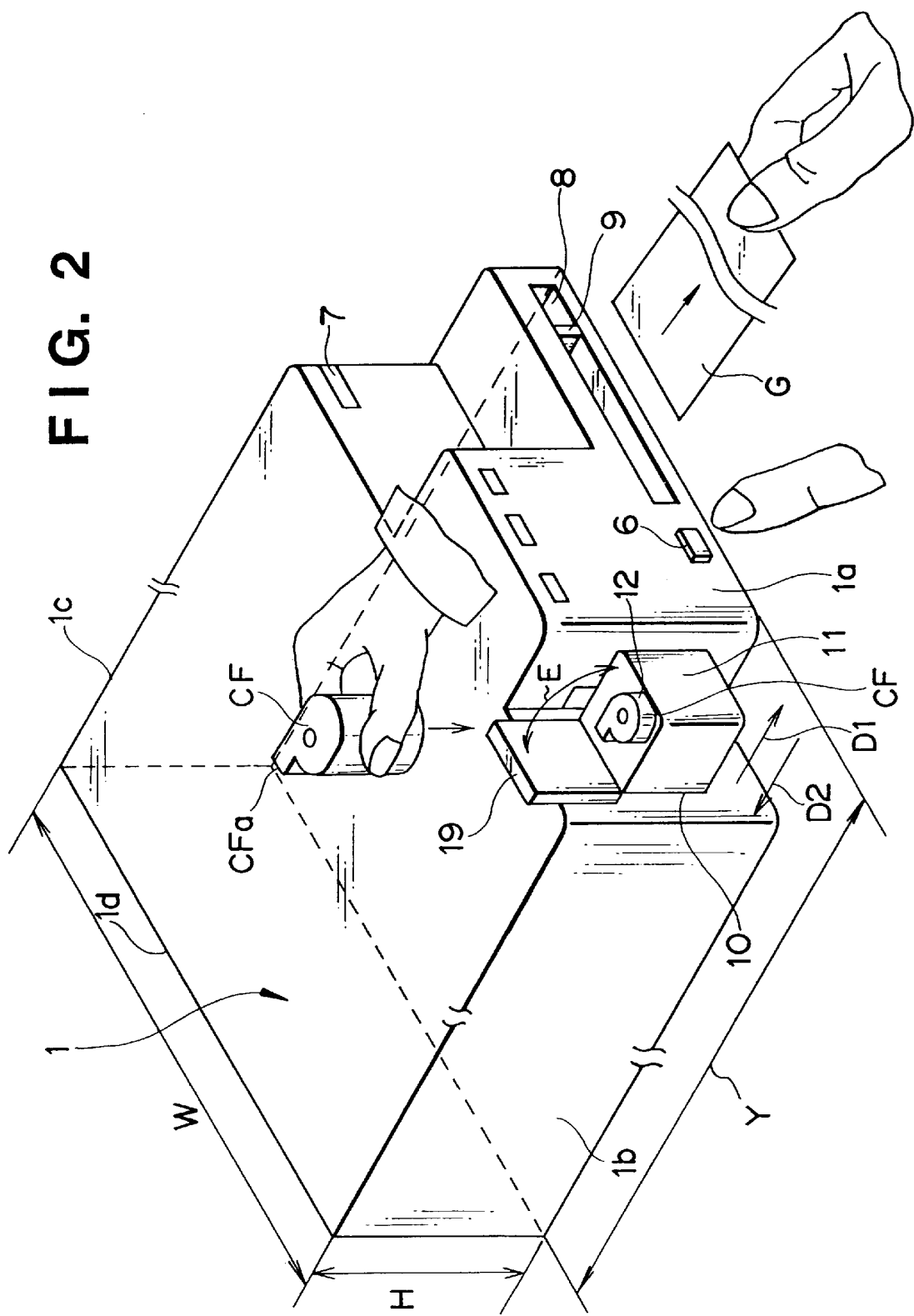

FIG. 31A FIG. 31B
DESCRIPTION OF THE OPERATION OF THE COMPONENTS
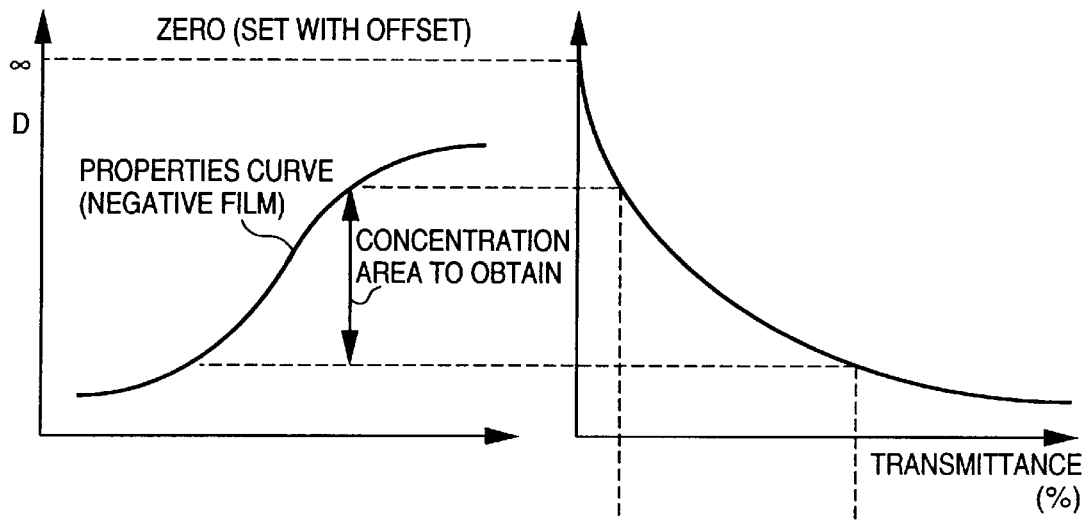
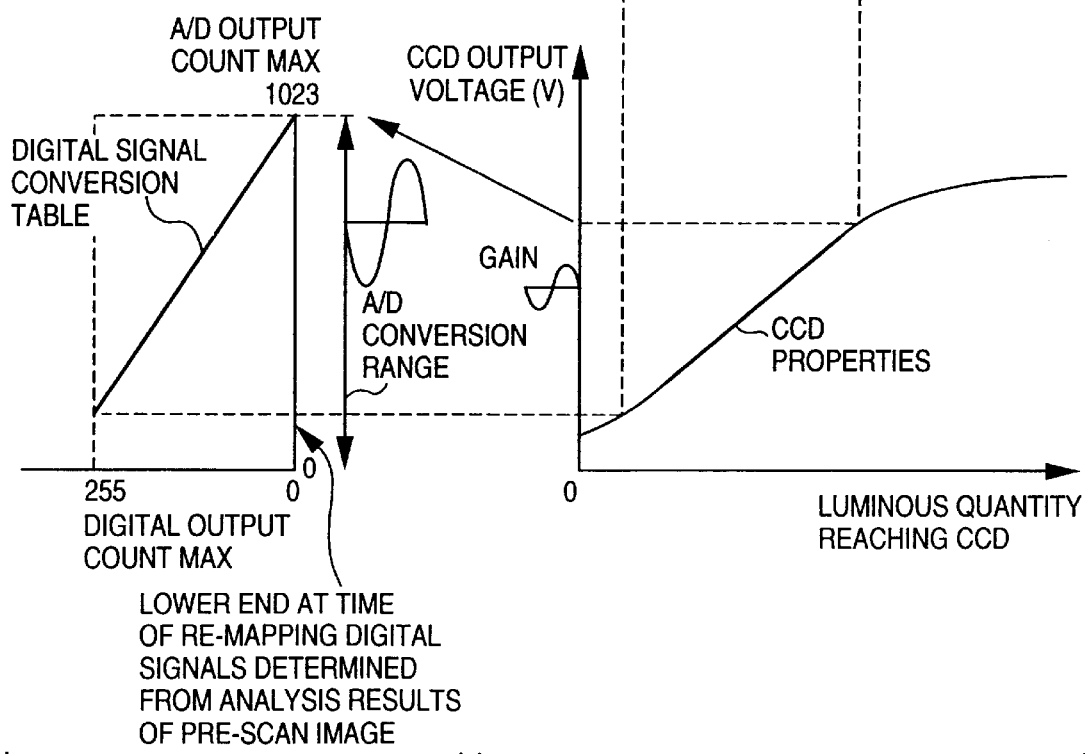
FIG. 31D FIG. 31C

SCANNER DEVICE AND CONTROL METHOD THEREOF, AND IMAGE INPUT SYSTEM

BACKGROUND OF THE INVENTION

1. Field of the Invention

The present invention relates to a scanner device which reads film of a certain format and a control method thereof, and an image input system.

2. Description of Related Art

A known scanner device (Japanese Patent Laid-Open No. 5-145838) which handles two types of film, namely film strips and film stored in cartridges has been proposed.

Also, known scanner devices perform pre-scanning before main scanning for reading a film image in which the film image is read and parameters relating to exposure are set.

However, with known scanner devices, filters and the like must be used to perform color correction and the like before pre-scanning, depending on the format of film, such as negative film or positive film. However, known arrangements have required the operator to judge the type of film and mount the color correcting filters, and this have been insufficient in handiness of use with regard to this aspect.

Also, in the event of performing scanning of transparent originals such as photography film or the like, the original is irradiated by a light source, the transmitted light is converted into linear electric signals by means of a photo-electric converting device, and certain digital data is obtained by performing A/D conversion of these electrical signals. It is preferable to match the range of quantity of transmitted light (the intensity of transmitted light) with the range of quantity of convertible light of the photo-electric converting device as much as possible, in order to digitize the change in the quantity of transmitted light to the fullest extent effectively using the number of bits employed for this A/D conversion.

Generally, such scanning has been performed in two runs, pre-scanning and main scanning. First, a pre-scan is performed at low resolution. The conditions for this pre-scan is a single setting determined by the type of film, such as negative or positive. The pre-scan image thus obtained is displayed on the monitor as a preview image. The user observes this preview image, and manually sets brightness, tint, and so forth for the main scan, following which the main scan is executed. However, this above-described conventional method requires the user to make settings for each original that is to be subjected to main scanning, which means that in the event that a great number of images are to be handled a great deal of time is required, and the load on the user is great as well. According, a method has been conceived wherein the pre-scan image is analyzed by computer, and the computer automatically sets the scanning conditions fore the main scan based on those results. For example, the average brightness of the original is calculated from the pre-scan image, the luminous quantity of the light source is changed accordingly, thus adjusting the luminous quantity reaching the CCD. Or, according to this idea, the scan speed may be adjusted, so as to performed scanning appropriate for each original, so as to effectively obtain information recorded on the original.

The original is irradiated by the light source, the transmitted light thereof is converted into electrical signals which are linear as to the transmittance factor of the original by means of a photo-electric converting device, and A/D conversion of these electrical signals obtains digital signals. The digital signals obtained here are further converted into scanner output digital signals via a digital signal conversion table. This arrangement can handle film types such as negatives or positives by changing this digital signal conversion table. For example, methods for removing differing color balances according to the film type by means of manually selecting a plurality of digital signal conversion tables corresponding with each film stored in the host computer are being used in scanners actually on the market.

However, in order to effectively use the number of bits for A/D conversion, the output voltage from the concentration range to be obtained by the photo-electric converting device must be matched with the A/D conversion area. Known systems have used adjustment of electrical gain, offset, luminous quantity, etc. to set the A/D conversion range to match the concentration area of the original to be obtained. However, this destroys linearity to the concentration of the original, necessitating handling of such warped image data. This means that precise control of $\gamma$ correction to the original is difficult, and in the event of handling various negatives with differing exposure conditions, it has been impossible to perform appropriate $\gamma$ correction for each.

SUMMARY OF THE INVENTION

The present invention has been made to solve the aforementioned problems of the known art, and it is an object thereof to provide a control method of a scanner device capable of accurately performing correction of focal distance and color of the film before pre-scanning, by reading a portion of the film image before pre-scanning.

Also, the control method of the scanner device according to the present invention is as follows:

The control method for a scanner device which has reading means for reading images from film of a certain format while performing relative movement of the film of a certain format, the control method comprising the following steps: a first scanning step for reading a portion of the images of the film of a certain format and setting a first condition for the reading means; a second feeding step for reading the images of the film of a certain format under the first condition and setting a second condition for the reading means; and a third feeding step for reading the images of the film format under the second conditions. This is a first aspect of the present invention.

Also, the scanner device according to the present invention is constructed as follows:

The scanner device has reading means for reading images from film of a certain format while performing relative movement of the film of a certain format, the scanner device comprising: first feeding means for reading a portion of the images of the film of a certain format and setting a first condition for the reading means; second feeding means for reading the images of the film of a certain format under the first condition and setting a second condition for the reading means; and third feeding means for reading the images of the film format under the second condition. This is an eighth aspect of the present invention.

It is second object of the present invention to provide an image input system which can execute $\gamma$ correction to the original as correction to the original in a manner as pure as possible, while using the number of bits used for A/D conversion effectively.

In order to solve the above problems and achieve the objects, the input system according to the present invention is as follows:

The image input system performs conversion of output voltage corresponding with a concentration area of an image read by a photo-electric converting device into certain digital data, by means of adjusting means for adjusting the output voltage of the photo-electric converting device and digital signal converting means for A/D conversion of the output voltage into digital signals. This is a tenth aspect of the present invention.

Also, the image input system according to the present invention is as follows:

The image input system comprises: adjusting means for matching output voltage corresponding with a concentration area of an image read by a photo-electric converting device into an A/D convertible range; and digital signal converting means for extracting the valid range of the digital signals obtained by A/D conversion. This is a fourteenth aspect of the present invention.

Also, the image input system according to the present invention is as follows:

The image input system comprises: photo-electric converting means for performing photo-electric conversion of transmitted light of an original document image; signal processing means for performing offset amplification of the output signals of the photo-electric converting means; A/D converting means for performing A/D conversion of output signals of the signal processing means; and setting means which sets the offset value such that the output signal of the photo-electric converting means is at zero level when shielded from light, and sets the amplification factor such that the output signal from the photo-electric converting means at the point in the concentration range of the image with the weakest concentration is at the upper end of the A/D conversion range of the A/D converting means. This is a twenty-first aspect of the present invention.

BRIEF DESCRIPTION OF THE DRAWINGS

FIG. 2 is an external perspective view of the scanner device relating to an embodiment of the present invention;

FIGS. 31A through 31D are diagrams for explaining the operation of each portion shown in FIG. 28.

DETAILED DESCRIPTION OF THE PREFERRED EMBODIMENTS

The following is a detailed description of the preferred embodiments of the present invention, with reference to the attached drawings. First, FIG. 1 is an external perspective view relating to the embodiments, showing the overall construction of the system for using the scanner device 1.

Figure 1:
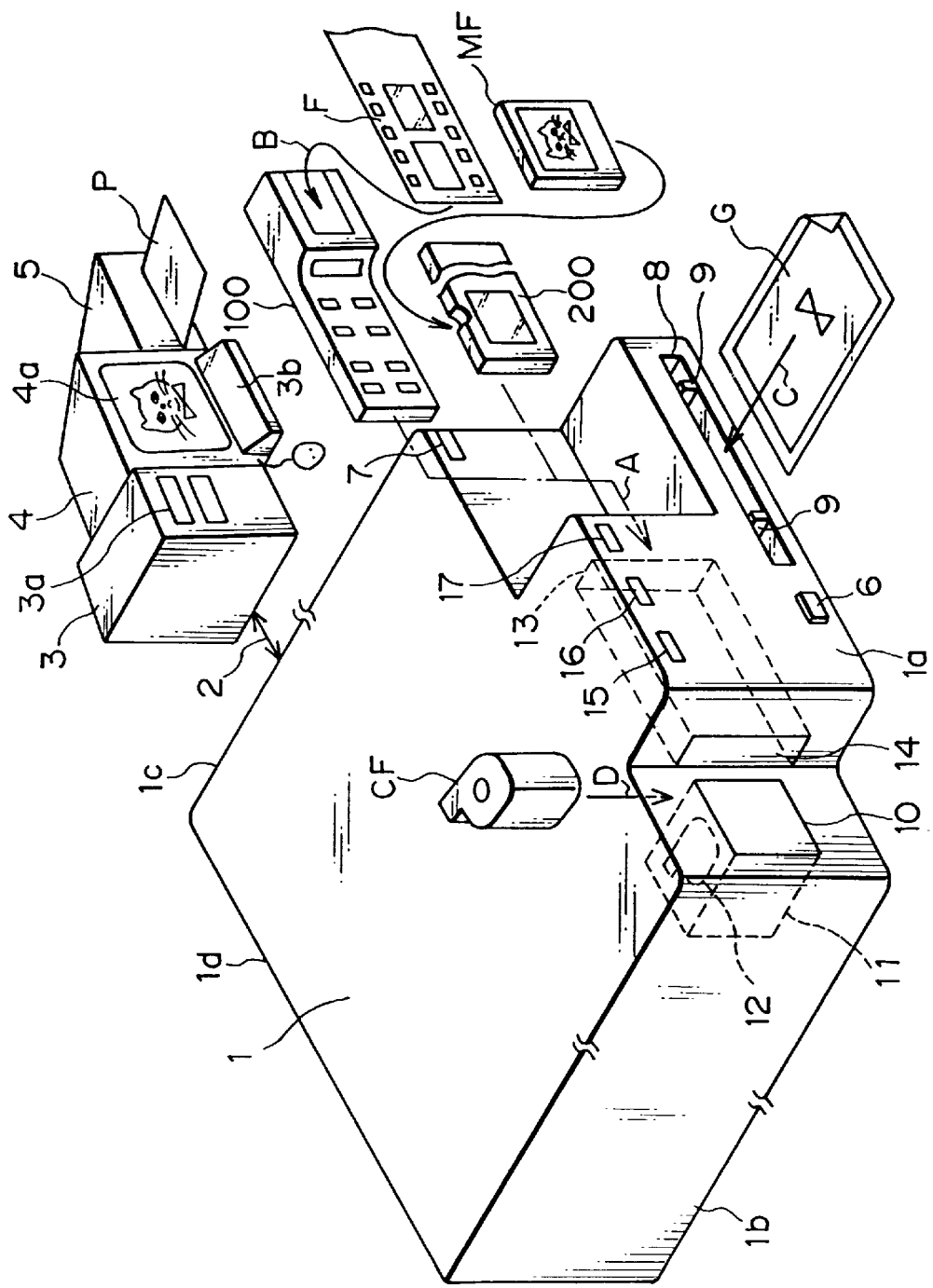
FIG. 1 is an overall constructional view of the usage state of the scanner device relating to an embodiment of the present invention.

In the Figure, there are various types of use of the scanner device 1, but a representative method of use thereof will be briefly described with reference to the overall constructional diagram of the system as shown in FIG. 1.

This scanner device 1 performs the following operations: (i) performs main scanning and sub-scanning of a negative or positive image recording medium on which a color or monochrome analog image is recorded; (ii) performs analog/digital (A/D) conversion of the analog image signal obtained by photo-electric conversion with photo-electric conversion device including a built-in high-resolution line image sensor; (iii) sends the digital signals obtained by this A/D conversion to an image processing unit 3a of a personal computer 3 via an interface cable 2 such as a SCSI cable or the like; (iv) the user confirms the read image on the screen 4a of the display device 4 which is a monitor device, and changes the image as desired by operating the operating unit 3b which includes a mouse and keyboard to synthesize, enlarge, reduce, paste, etc.; and (v) outputs the image thus obtained in color or monochrome on recording sheets of a certain size including standard paper by means of a recording device 5 including ink-jet printers, thus obtaining a desired size of a recorded sheet P.

With the above-described as a basic usage form, the formats of image recording medium carrying analog images which can be handled with this scanner device 1 are can be generally divided into the following four groups:

First, a first image recording medium is negative and positive film F used for silver-salt-type cameras which are in widespread use today. For example, a 36-exposure developed strip of 135 mm film is cut into strips of 6 continuous frames, each strip being the same length, and stored in a negative sheet case and handed to the user along with the prints.

Consideration has be made so that the scanner device is capable of structurally handling 36-exposure 135 mm film which has not yet been cut into 6-frame slits, as well.

On the other hand, a second image recording medium is mounted film MF which is comprised of developed positive (reversible) film cut in single frames and mounted in slide frames to enable use mainly with slide projectors.

Also a third image recording medium is color or monochrome silver-salt photographs and various printed materials, these being reflective original documents G from which an analog image recorded on the surface thereof is read by reflection, such as an original document G of a panorama photograph which is inserted in the longitudinal direction in the direction of the arrow and is read.

Finally, a fourth image recording medium is a cartridge film CF corresponding to Advanced Photo System which is a new-standard film. This cartridge film CF is known art, but to make a brief description thereof, a 40-exposure film for example is wound on a built-in spool and stored in a case which shields the film from external light. The film is stored again in the case in a wound state following camera photography and processing by a laboratory shop, the user being provided with the film along with a so-called index print which has all of the frames printed with index numbers. Accordingly, the user indicates the desired index numbers in order to obtained the desired photographs.

This scanner device 1 is capable of handling all of the above first through fourth image recording mediums. The following is a schematic description of the operation procedures of each of the image recording mediums, with reference to FIG. 1.

First, in order to handle the film F which includes 135 mm film which is the first image recording medium, the continuous film unit 100 is used. This continuous film unit 100 is structure so as to be automatically mountable to the scanner device 1.

Accordingly, the continuous film unit 100 is provided so as to be insertable in the direction shown by an arrow from the right opening portion 13 shown by broken lines, provided so as to open to the right and left as shown in the Figure at the front 1a of the scanner device 1. In the event that the presence of the continuous film unit 100 is detected by an optical sensor which also serves as a barcode reader for bar-code provided to the top and bottom portions of the film, this sensor being the sensor k3 provided near the right opening 13 of the device 1, a later-described built-in motor m2 is automatically activated upon reception of the second detection results, so that the inserted tip of the continuous film unit 100 is transported to the left opening 14 shown with solid lines, and the arrangement is such that the unit 100 automatically stops at the left opening 14.

Following mounting of this continuous film unit 100 to the device 1, preliminary sub-scanning of the film F is performed by manually setting a negative or positive film F of six continuous frames in the unit 100 in the direction indicated by the arrow B. Then the film F is transported in the reverse direction so as to perform the following operations: (i) main-scanning and sub-scanning of the image recording medium upon which the analog image is recorded; (ii) A/D conversion of the analog image signal obtained by photo-electric conversion with the photo-electric conversion device including built-in high-resolution line image sensor, the above mentioned operations of (iii) to (v) are performed, and thus obtaining a recorded sheet P of output on recording sheets of a certain size including standard paper by means of a recording device 5 including ink-jet printers. Accordingly, this continuous film unit 100 is indispensable.

Also, in order to handle slide-mounted film MF of film mounted in a slide mount which is the second image recording medium, the slide film unit 200 is used in the state of the above continuous film unit 100 being removed from the device 1.

This slide film unit 200 is constructed such that six slide-mounted films MF can be set from the upper opening thereof such that each are retained in certain positions. The overall length thereof is slightly linger than that of six frames of continuous film F, and the width dimensions ahead of and behind the slide film unit 200 is set at approximately 5 mm.

On the other hand, the width dimensions of the above continuous film F is around 0.15 mm, meaning that the later-described transporting functions are necessary for both.

This slide film unit 200 can be automatically mounted to the scanner device 1 in the same manner as with the above continuous film unit 100, and accordingly, is provided so as to be insertable in the direction shown by an arrow A from the right opening portion 13 shown by broken lines, provided so as to open to the right and left as shown in the Figure at the front 1a of the scanner device 1. In the event that the presence of the slide film unit 200 is detected by the optical sensor provided near the right opening 13 of the device 1, the built-in motor is automatically activated upon reception of the detection results.

Consequently, the slide film unit 200 is transported to the left in the drawing to an appropriate position via the left opening 14 illustrated in the Figure in solid lines, and preliminary scanning of the six mounted films MF in the slide mounts is performed. For example, six of the mounted films MF set in slide mounts, (i) The mounted films are transported in the follow and reverse direction to perform scanning, (ii) A/D conversion of the analog image signal obtained by photo-electric conversion with photo-electric conversion device including built-in high-resolution line image sensor is performed, the above mentioned operations of (iii)–(v) are performed, and thus obtaining a recorded sheet P of output on recording sheets of a certain size including standard paper by means of a recording device 5 including ink-jet printers. Incidentally, the image formed on the emulsion surface of the film F mounted to the continuous film unit 100 and transported, and the image formed on the emulsion surface of the mounted film MF set to the slide film unit 200 differ in distance from the image reading surface of the later-described line image sensor, so the a converging lens is provided with an automatic focusing mechanism. Accordingly, accurate focusing of the image can be performed even in the event that the film F and the mounted film MF are each set backwards.

Also, the reflective original document G which is a third image recording medium includes original documents which are quite long in the sideways direction, such as panorama photographs and the like. The device 1 is constructed such that such original documents G and standard so-called service-size print photographs can be inserted in the direction of the arrow C in the document inserting/ejecting opening 8 provided to the lower portion of the front 1a of the device 1 as shown in the Figure, whereby the original document is automatically drawn in and read. After the reading operation, the original document is then ejected from the same inserting/ejecting opening 8.

Accordingly, the external dimensions of the device 1 following the forward/rear directions are determined with consideration to the dimensions of panorama photographs following the longitudinal dimensions thereof. Provided to this inserting/ejecting opening 8 are original width adjusting plates 9 which are original width adjusting plates 9 which restrict the original document G in the width direction, these being arranged according to known arrangement such that moving one or both causes the plates to either be removed or distanced from a center position.

The cartridge film CF which is the fourth image recording medium is set in the direction shown by the arrow to cartridge film mounting unit 11 of the cartridge film CF provided next to the left opening 14 in the front 1a of the device 1 as shown in broken lines in the Figure. Accordingly, the device 1 is provided with an opening 10 for allowing the cartridge film mounting unit 11 to move forwards and backwards, so as to allow for storage of the cartridge film cartridge CF via the mounting hole 12 formed in the cartridge film mounting unit 11, following forward movement as described later.

Next, an indicator 7 comprised of a light-emitting diode or the like which is continuously lit according to the state of the main power being switched on to serve as an indicator for indicating the on/off state of the main electrical power switch provided to the rear 1d or the side 1b or 1c of the device 1 is provided to a portion to the upper right corner of the front 1a of the device 1 which does not interfere with the above units 100 or 200 when mounted.

Also, provided to the front 1a between the above left and right openings 13 and 14 is an indicator 15 which indicates the operation state of cartridge film CF, an indicator 16 which indicates the operation state of standard film F including 135 mm film and mounted film MF, and an indicator 17 which indicates the operation state of original documents G, these indicators being arrayed from the left to the right respectively, each constructed so as to indicate each mode as follows: a solid green for a waiting state, a blinking green for a normal operating state, and a blinking red for an abnormal state such as incorrect operation such as jamming.

Formed below these indicators 15, 16, and 17 is an eject switch 6 to be pressed in order to move the cartridge film mounting unit 11 from the opening 11 toward the front of the device 1.

FIG. 2 is an external perspective view of the device 1, showing the state wherein reading of an original has been completed and the eject switch 6 has been pressed.

In the Figure, the constructions which have already been described are denoted with the same reference numerals and description thereof will be omitted, with description being limited to unexplained portions. At the point that the eject switch 6 is pressed, a later-described cartridge film mounting unit moving mechanism is activated, and the cartridge film mounting unit 11 of the cartridge film CF is moved toward the front of the device 1 in the direction of the arrow D1 via the opening 11, so as to fill the left opening 14. Accordingly, in this state, other mediums can not accepted, at least visually.

In the state shown in the Figure, a lid 19 provided above the cartridge film mounting unit 11 and axially borne is rotated in the direction of the arrow, so that the cartridge film CF film extracting opening CFa can face the device, regarding the mounting hole 12 of the cartridge film mounting unit 11. This resembles the cartridge film loading system for Advanced Photo system type cameras, so the operability thereof is unmistakable.

Once set in the mounting hole 12, the cartridge film CF is detected by a micro switch built in to the cartridge film mounting unit 11, this detection causing the cartridge film mounting unit 11 moving mechanism to operate, moving the cartridge film mounting unit 11 in the direction of the arrow D2, and at the same time the lid 19 closes.

The external dimensions of the device 1 defined by the width dimensions W and depth dimensions Y and height dimensions H are such that take into consideration usage in the state of a flatbed-type scanner for an A4 size document, for example. Accordingly, the mounting operations of the above various mediums can be all performed from the front 1a side of the device 1, in the case that a flatbed-type scanner is mounted.

In other words, each of the later-described transporting systems and optical systems are set according to such considerations.

Incidentally, regarding the preset embodiment, the arrangement is such that each of the units are mounted from the right, taking into consideration the face that the majority of people are right-handed, but it is needless to say that the device can be set to appropriately deal with left-handed people.

Figure 3A:
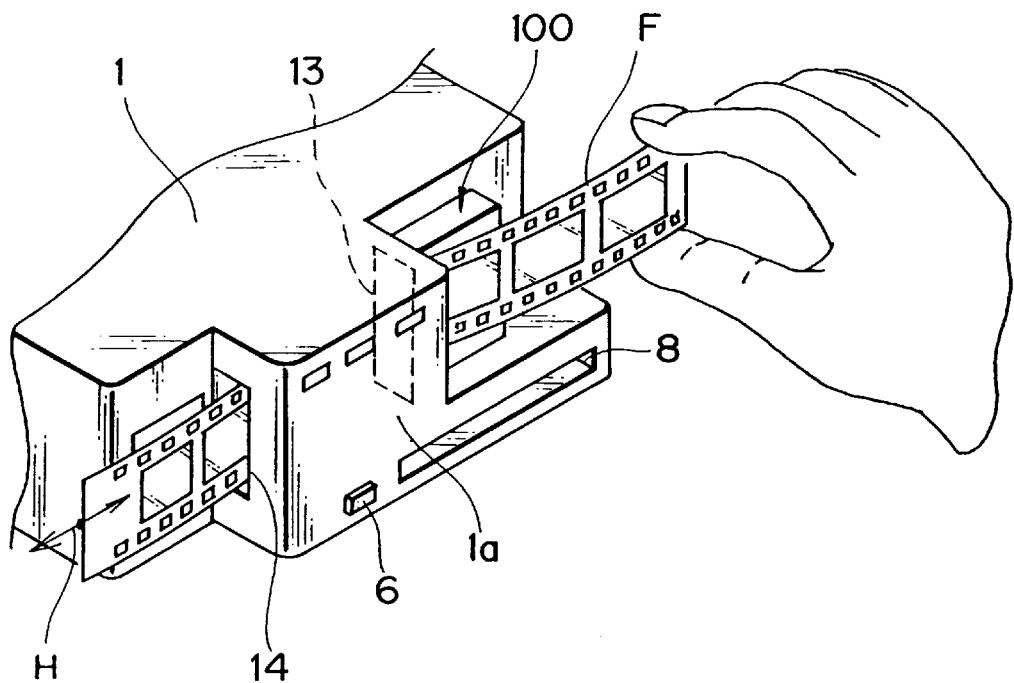
FIG. 3A is an external perspective view illustrating the usage state of a continuous film unit 100.
Figure 3B:
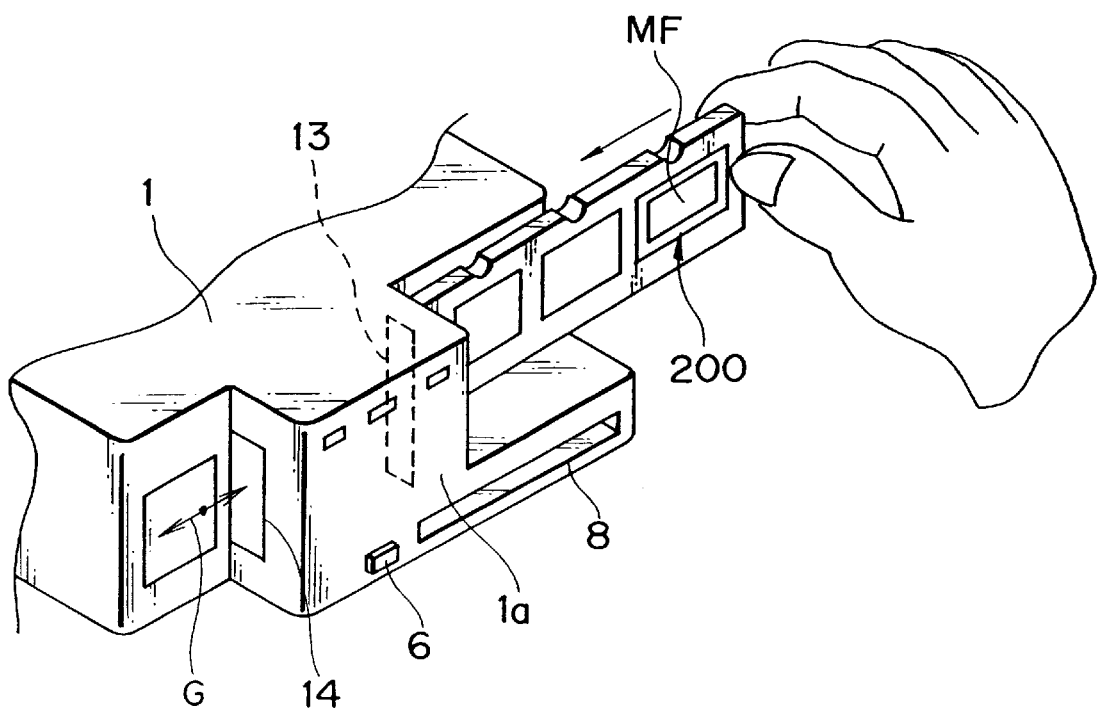
FIG. 3B is an external perspective view illustrating the usage state of a slide film unit 200.

Next, FIG. 3A is an external perspective view illustrating the state of the continuous film unit 100 mounted to the device 1, and FIG. 3B is an external perspective view illustrating the state of the slide film unit 200 mounted to the device 1.

First, in FIG. 3A, once the continuous film unit 100 is mounted via the right opening 13 shown by broken lines to the device 1 and is automatically moved to the predetermined position, the resultant state is such as shown in the Figure. Now, the operator holds the certain film F including 135 mm film so as not to directly touch the image surface, and sets the film in the continuous film unit 100. The film F is then transported in the follow and reverse direction (arrow D) from the left opening 14 and scanning thereof is performed.

Also, in FIG. 3B, once the slide film unit 200 set with up to six mounted films MF beforehand is mounted via the right opening 13 shown by broken lines to the device 1 and is automatically moved to the predetermined position, the resultant state is such as shown in the Figure. This is then transported in the follow and reverse direction (arrow D) so that there is partway protrusion from the left opening 14 and scanning thereof is thus performed.

The above construction means that new CARTRIDGE film CF cannot be handled in this state, at least visually.

Figure 4:
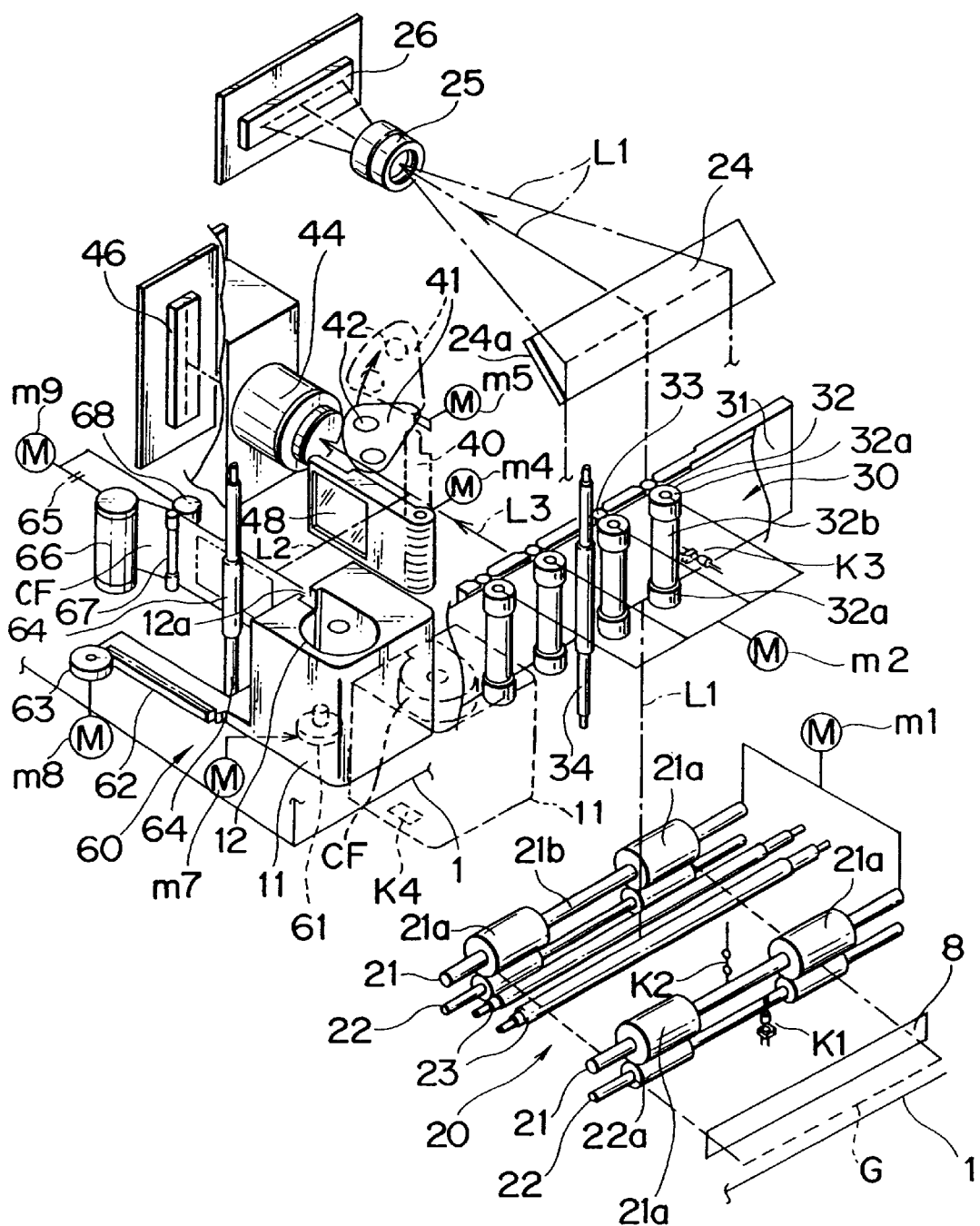
FIG. 4 is an external perspective view of each of the reading units built into the scanner device.

FIG. 4 is an exterior perspective view illustrating the mechanism of device 1, and the constructions which have already been described are denoted with the same reference numerals and description thereof will be omitted.

First, the original G reading unit 20 shown with broken lines is constructed as follows: Force is obtained from a first motor m1 such as a stepping motor or the like, and urethane rubber is used for right and left elastic members 21a which come into direct contact with the surface of the original. A pair of roller pairs, comprised of the elastic members being fixed to shafts 21b comprising drive rollers 21 and idlers 22 which are in constant contact with the drive rollers 21 at a certain pressure and follow the rotation thereof, is provided, with another such roller pair being also provided downstream, and further two sets being provided to an unshown base.

Provided between these roller pairs are two cold cathode tubes 23 by which high brightness can be obtained at low temperature, fixed to the base (unshown), so as to irradiate the surface of the original document G.

Provided above the two cold cathode tubes 23 is a reflecting mirror 24 having a reflecting surface 24a of the width direction of the original document G fixed to the base (unshown) so as to be at a 45- angle as to the original document surface, so as to direct the optical axis L1 from the surface of the original in between the two cold cathode tubes 23 toward a converging lens 25, converging to a line image CCD 26 of a certain resolution fixed to the base, so as to perform scanning of the original document surface.

Incidentally, these are stored in an unshown dark box, shielded from exterior light. Also, the state of transportation of the original document G is continuously monitored by sensor K1 and sensor K2 which are optical sensors comprised of photo-emitting photo-receptor diodes provided to the positions shown in the Figure, thus enabling detecting of presence or absence of original documents, and detecting of completion of the reading operation.

Next, the construction of the 135 mm film F reading unit 30 is as follows: fixed to the unshown base is a second motor m2 which is capable of reverse rotation such as a stepping motor and is driven according to set driving pulses, so as to drive the total four first drive rollers 32 via a force transmitting mechanism shown is solid lines in the Figure regarding this second motor m2.

Each of the first drive rollers 32 is comprised of a shaft 32b upon which is provided a pair of elastic members 32a using urethane rubber at the upper and lower portions where direct contact is made with the outer surface of the image recording portion of each frame of the film F.

Also, provided to positions opposing each of the first drive rollers 32 are idler rollers 33, rotatable and pressed, so as to maintain a gap smaller than the approximately 5 mm which is the width of the above slide film unit 200, these being provided rotatably to the base 31.

On the other hand, a cathode tube 34 is provided between the first drive rollers 32 centrally positioned, such that the image of the film F is directed toward the converging lens 44, converging to the line image CCD 46 of the certain resolution fixed to the base, so as to perform main scanning and sub-scanning of the film F and the mounted film MF. Also, these are stored in later-described dark box, shielded from exterior light.

Also, an optical path converting mechanism 40 provided with a reflecting mirror 48 is provided in the optical axis L3 shown in the Figure by a single-dot broken line connecting the converging lens 44 and cathode tube 34, arranged so as to be rotatable by 45- by means of a fourth motor m4, constructed so as to be in states of shielding the optical axis L3 and directing the optical axis L3 to the converging lens 44.

Further provided between this optical path converting mechanism 40 and the converging lens 44 is a filter converting mechanism 41 having a plurality of filters, provided so as to be rotated by a fifth motor m5, constructed so as to insert an appropriate filter 42 into the optical axis L3, according to the concentration of the film F negative, positive, or image of the various stipulations.

Next, the cartridge film CF reading unit which is the fourth image recording medium is constructed as follows:

A sensor K4 comprised of a micro switch is provided to the base plane of the mounting hole 12 of the above cartridge film mounting unit 11 to which the cartridge film CF is to be mounted. Also provided to the bottom plane of the mounting hole 12 is a dowel member 61 shown by broken lines, with a member constructed so as to engage the film winding spool of the cartridge film CF being provided rotatably thereto, so that the cartridge film mounting unit 11 meshes with this dowel member 61 via an unshown planetary gear mechanism as to a seventh motor m7 at the position shown by solid lines.

Also, a rack 62 is extended from the cartridge film mounting unit 11 as shown in the Figure, such that the cartridge film mounting unit 11 is driven to the solid-line and broken-line positions in the Figure via the opening 10 of the above device 1, by reverse driving of an eighth motor m8 provided to the output shaft of a pinion 63 which constantly meshes with this rack 62.

In the state of this cartridge film mounting unit 11 being mounted such, a cold cathode tube 64 is provided downstream from the film extracting opening CFa of the cartridge film CF, and with the optical axis L2 (shown by single-dot broken line) connecting the cold cathode tube 64 and the above optical path converting mechanism 40 is directed to the above converging lens 44 by the optical path converting mechanism 40 being rotated about 45- to rotate to the position shown by broken line, thus sharing the line image CCD 46 of the certain resolution between the above films F and MF.

Provided further downstream from the cold cathode tube 64 is a driving roller 68 having an elastic cylindrical urethane rubber member as the driving portion thereof, arranged so as to directly receive force from a ninth motor m9, and is constructed so as to pinch the cartridge film CF being fed from the film extracting opening CFa for the cartridge film CF by means of driving of the above seventh motor m7 between this driving roller 68 and an idle roller 67 provided so as to oppose this driving roller 68, such that the cartridge film CF passes over the cold cathode tube 64 at a constant speed, thereby performing main scanning and sub-scanning reading operations.

Provided further downstream from the driving roller 68 and idle roller 67 is a winding spool 66 arranged to obtain force from the above ninth motor m9 via a clutch 65, and the cartridge film CF is temporarily all wound into the winding spool 66 after reading.

Following the above reading operation, the ninth motor m9 is reversed, and the cartridge film is fed out backwards with an appropriate amount of back tension provided to the cartridge film CF and the spool within the case of the cartridge film CF is rotated by the dowel member 61 by driving the seventh motor m7, thereby storing all. Subsequently, this is ejected from the opening 10.

In this way, moving the cartridge film mounting unit 11 in the direction following the film ejecting direction for cartridge film CF structured to wind film on a spool stored within a cartridge, damage to the film can be kept at a minimal level in the event of jamming of the film.

Specifically, in the event that the indicator 15 shown in FIG. 1 turns red, the device can be terminated and the top plate of the device 1 opened, allowing for the film to be directly grasped from above.

Figure 5:
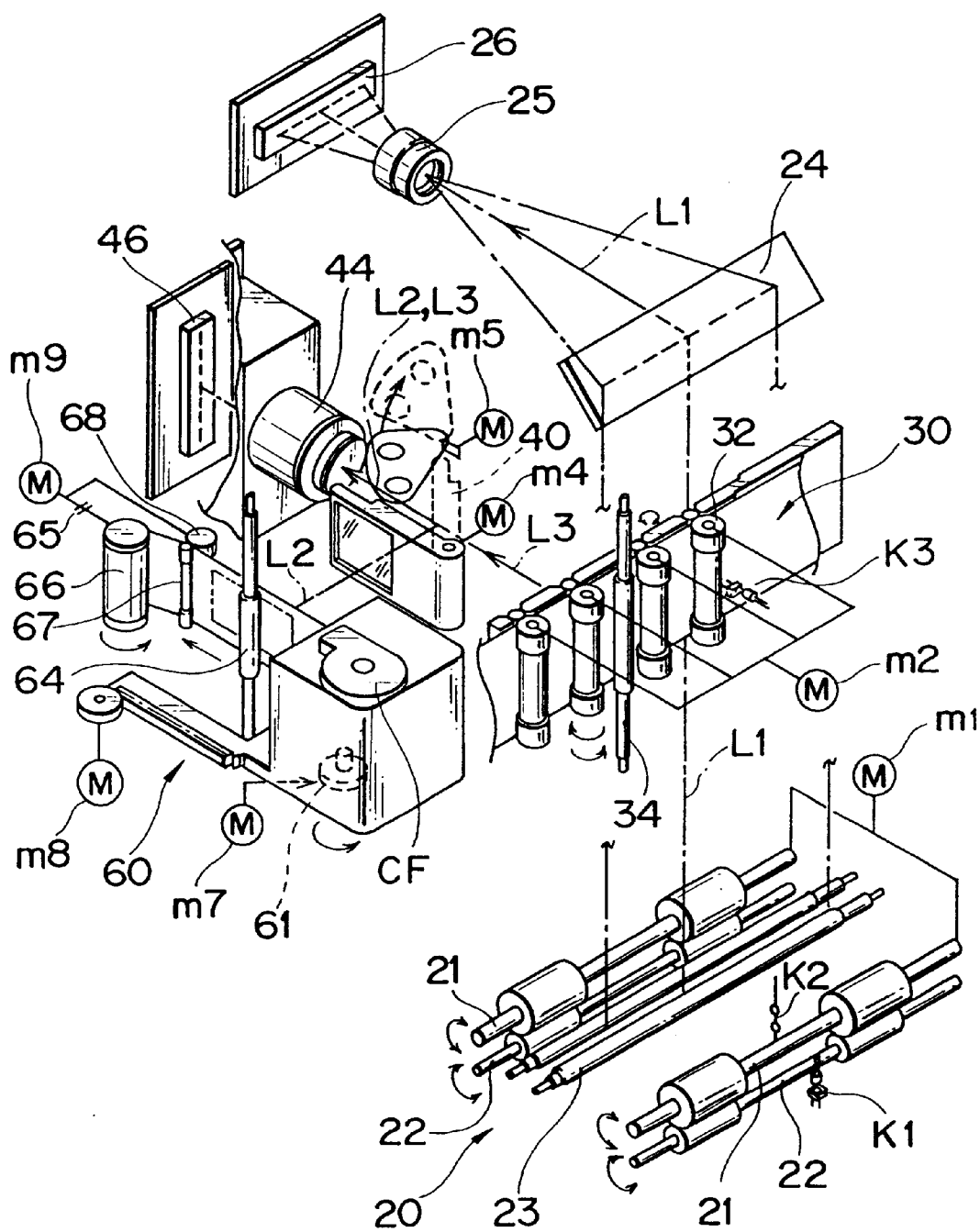
FIG. 5 is an external perspective view for describing the operation of FIG. 4.

FIG. 5 is an explanatory diagram of the operations of the reading units of FIG. 4. The constructions in the Figure which have already been described are denoted with the same reference numerals and description thereof will be omitted.

First, at the point that the original document G is inserted into the reading unit 20, the sensor K1 detects the leading edge of the original, activates the first motor m1 and rotates the drive roller 21 in a clockwise direction, causing the original document G to run past two cold cathode tubes 23, and directs the optical axis L1 to the converging lens 25 with a reflecting mirror 24 having a reflecting surface 24a of the width of the original document G, thereby reading at the CCD 26 (preliminary scanning). The drive roller 21 here can be constantly kept clean, since urethane rubber which has less viscosity than silicone rubber is used at the portions coming into direct contact with the surface of the original. Accordingly, the user's originals can be kept from being soiled. Once this preliminary scanning is completed, the first motor m1 is reverse-rotated and main scanning is started. Then the main scanning us completed, the original is ejected.

Next, after standard film F is set in the continuous film unit 100 or mounted film MF is set in the slide film unit 200, detection of starting of mounting is detected by a sensor K3, causing the second motor m2 to be activated which rotates the four first drive rollers 32, thereby performing the certain reading operation.

At this time, each of the first drive rollers 32 is constructed such that a pair of elastic members 32a using urethane rubber is provided on the shaft 32b at the positions at which direct contact is made with the outer sides of each of the frames of the film F.

Next, the reading operation of the cartridge film CF which is the fourth image recording medium is performed as follows: Once the cartridge film mounting unit 11 is moved to the position shown by solid lines by means of operation of the eighth motor m8, the seventh motor m7 is activated, the film of the cartridge film CF is fed between the drive roller 68 and idle roller 67, past the cold cathode tube 64 to the downstream of the film extracting opening CFa of the cartridge film CF. Next, the ninth motor m9 is activated, driving the drive roller 68 and idle roller 67, so as to perform reading while winding the whole with the winding spool 66. Following the above reading operation, the ninth motor m9 is reversed and the cartridge film CF is fed out backwards with an appropriate amount of back tension provided to the cartridge film CF and the spool within the case of the cartridge film CF is rotated by the dowel member 61 by driving the seventh motor m7, thereby storing all. Subsequently, this is ejected from the opening 10.

Figure 6:
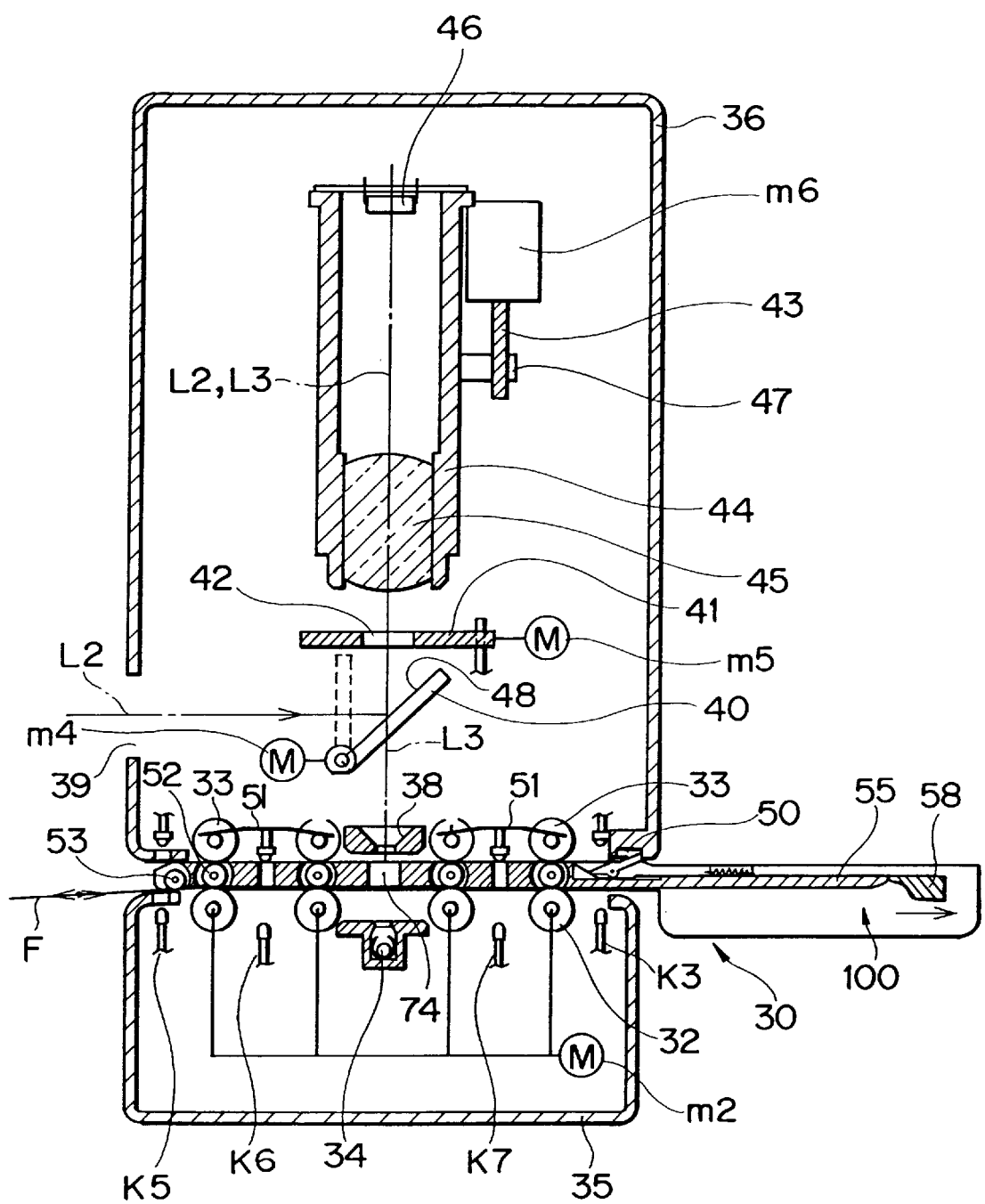
FIG. 6 is a cross-sectional diagram along the principal members of the film reading unit.
Figure 7:
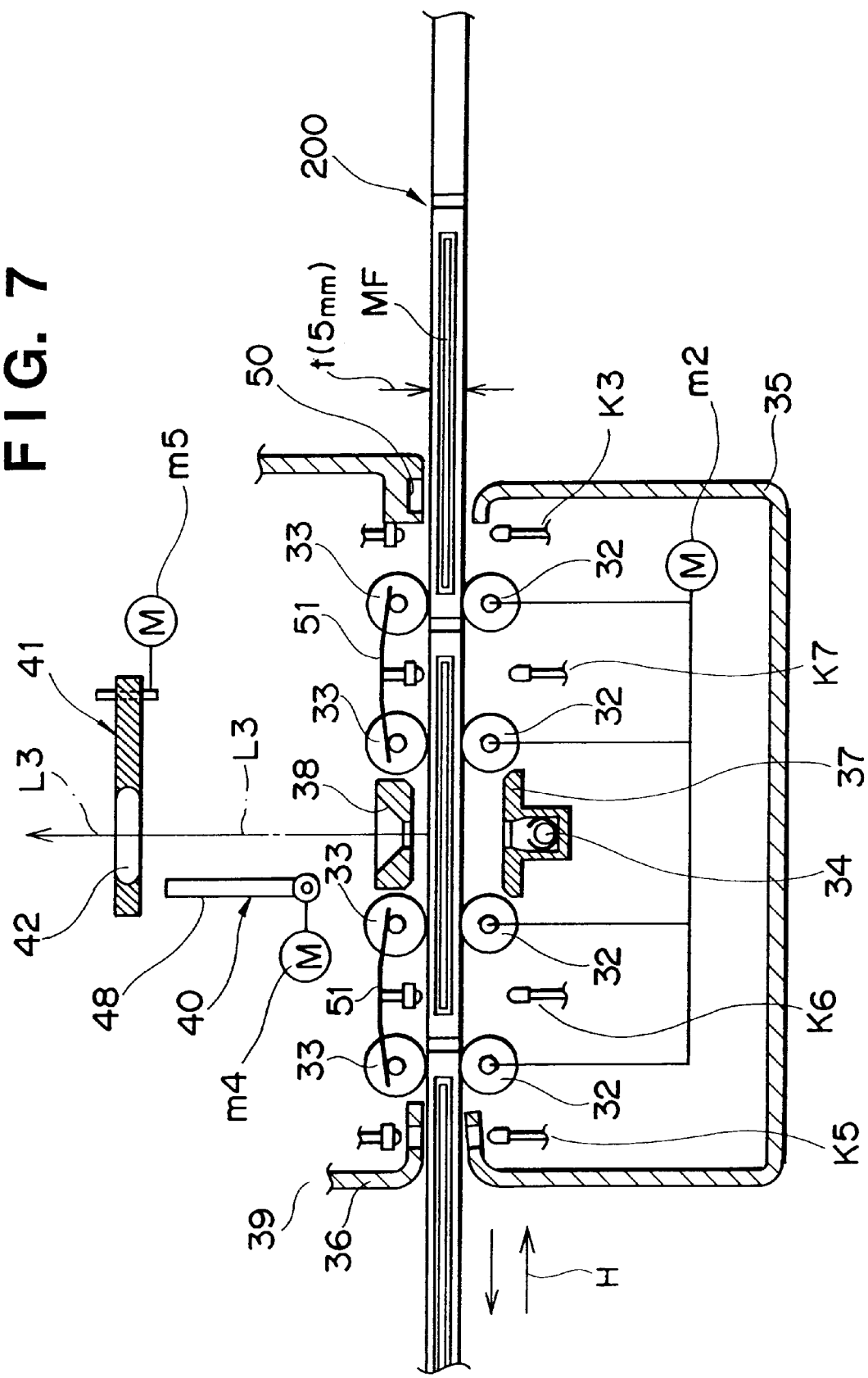
FIG. 7 is another cross-sectional diagram along the principal members of the film reading unit.

Next, the slide film unit 200 as described above is constructed in a storable manner so that six slide mounted films MF can be set from the upper opening and retained in a certain position, the overall length being somewhat longer that six frames of developed continuous film F, and since the forward and back width dimensions of the slide film unit 200 is approximately 5 mm and the width dimensions of the continuous film F is 0.15 mm, the space between the drive roller 32 and idle roller 33 must be 5 mm or more, and description will be made with reference to the cross-sectional diagrams of principal members of FIG. 6 and FIG. 7 regarding a mechanism which enables use of both the units 100 and 200. Here, the constructions which have already been described are denoted with the same reference numerals and description thereof will be omitted.

First, in FIG. 6, the converging lens 44 is constructed of a lens 45 built into a lens barrel, configured so as to converge the optical axes L2 and L3 to the CCD 46, with a screw-hole member 47 further provided to this lens barrel. This screw-hole member 47 screws to a screw 43 fixed to an output shaft of a sixth motor m6 fixed to the unshown base. The above construction provides for an automatic focusing mechanism. Also, an opening for introducing the optical axis L2 is formed to the dark box 36 at the position shown in the Figure.

Also, an engaging recessed portion 50 for fixing the continuous film unit 100 unmovable at the time of setting is provided to the dark box 36. Each of the idle rollers 33 are provided in a state pressed toward the drive rollers 32 by means of spring 51, and constructed so as to come into contact with the free roller 52 and rotate in the state that the continuous film unit 100 has been mounted, as shown in the Figure.

On the other hand, sensors K3, K5, K6, and K7 are provided at the positions shown in the Figure, monitoring each operation. Also, an aperture 38 is provided at the center position facing the cathode tube 34.

Now, FIG. 7 illustrates the state in which the slide film unit 200 is mounted and being transported in the direction of the arrow D, in which case the slide film unit 200 is pinched between the idle roller 33 and the drive roller 32. That is, the width dimensions t of the unit 200 are approximately 5 mm, so the slide film unit 200 can be transported as such.

The configuration of the continuous film unit 100 will be described based on the frontal view shown in FIG. 8 and the cross-sectional diagram of the principal components shown in FIG. 9.

Figure 8:
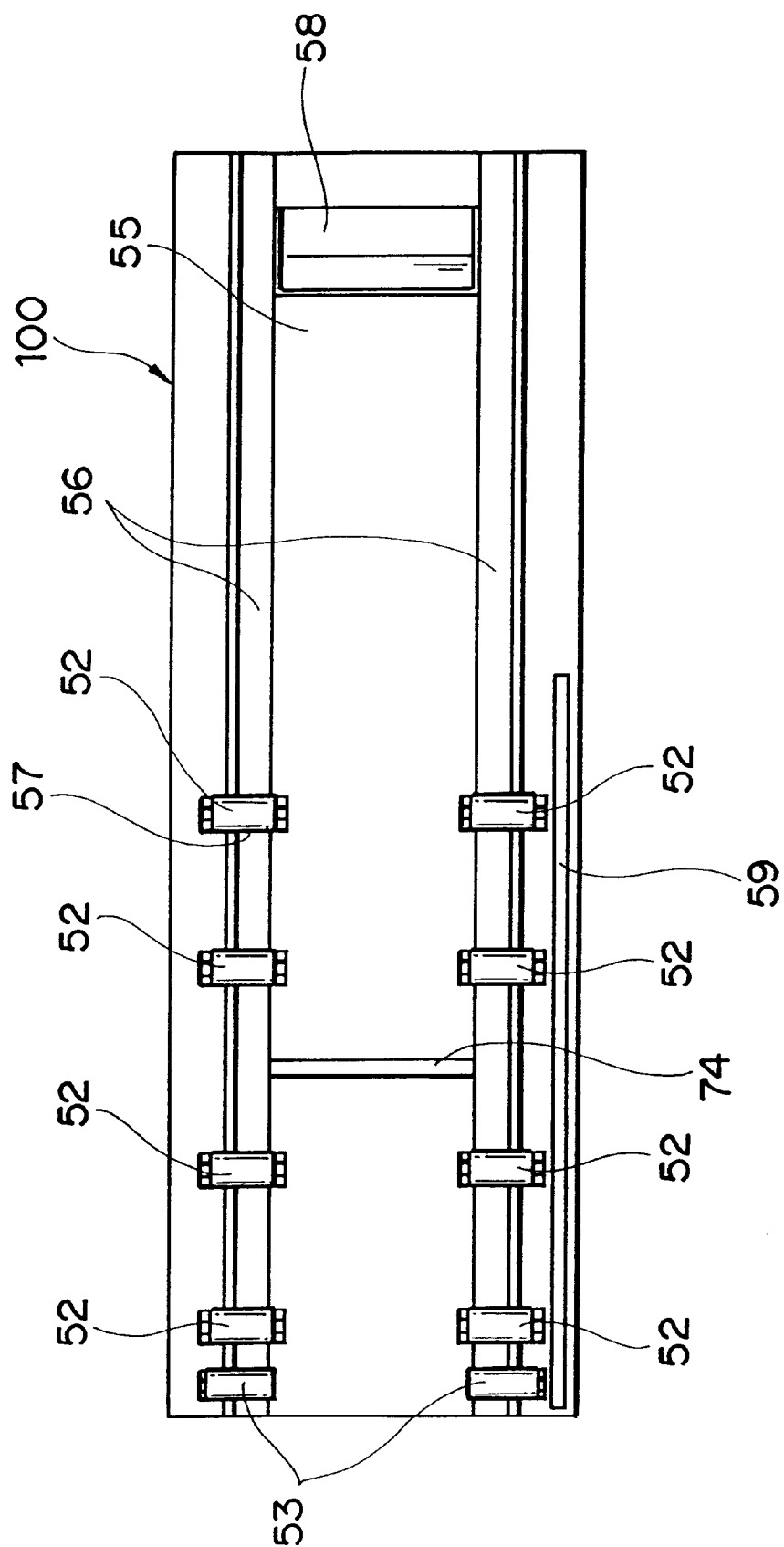
FIG. 8 is a frontal view of the continuous film unit 100.
Figure 9:
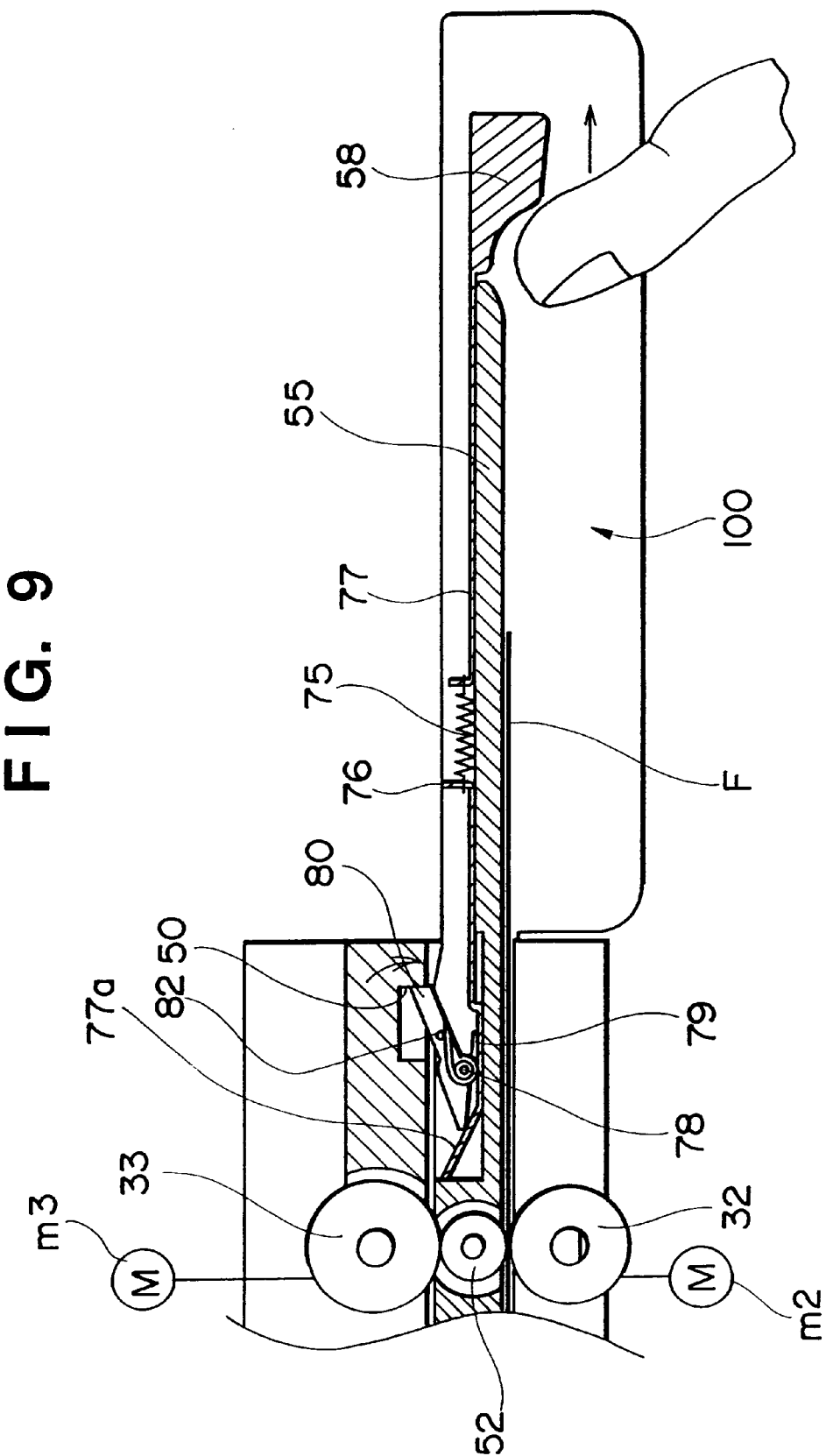
FIG. 9 is a plan view of the continuous film unit 100 following mounting.

In FIG. 8, the continuous film unit 100 is provided with a base 55 having a somewhat protruding film running surface 56 and aperture 74 for passing light source from the cathode tube, and also has rotatably built in a total of eight of the above free rollers 52. The continuous film unit 100 also has free rollers 53 rotatably built in, as well.

Figure 10:
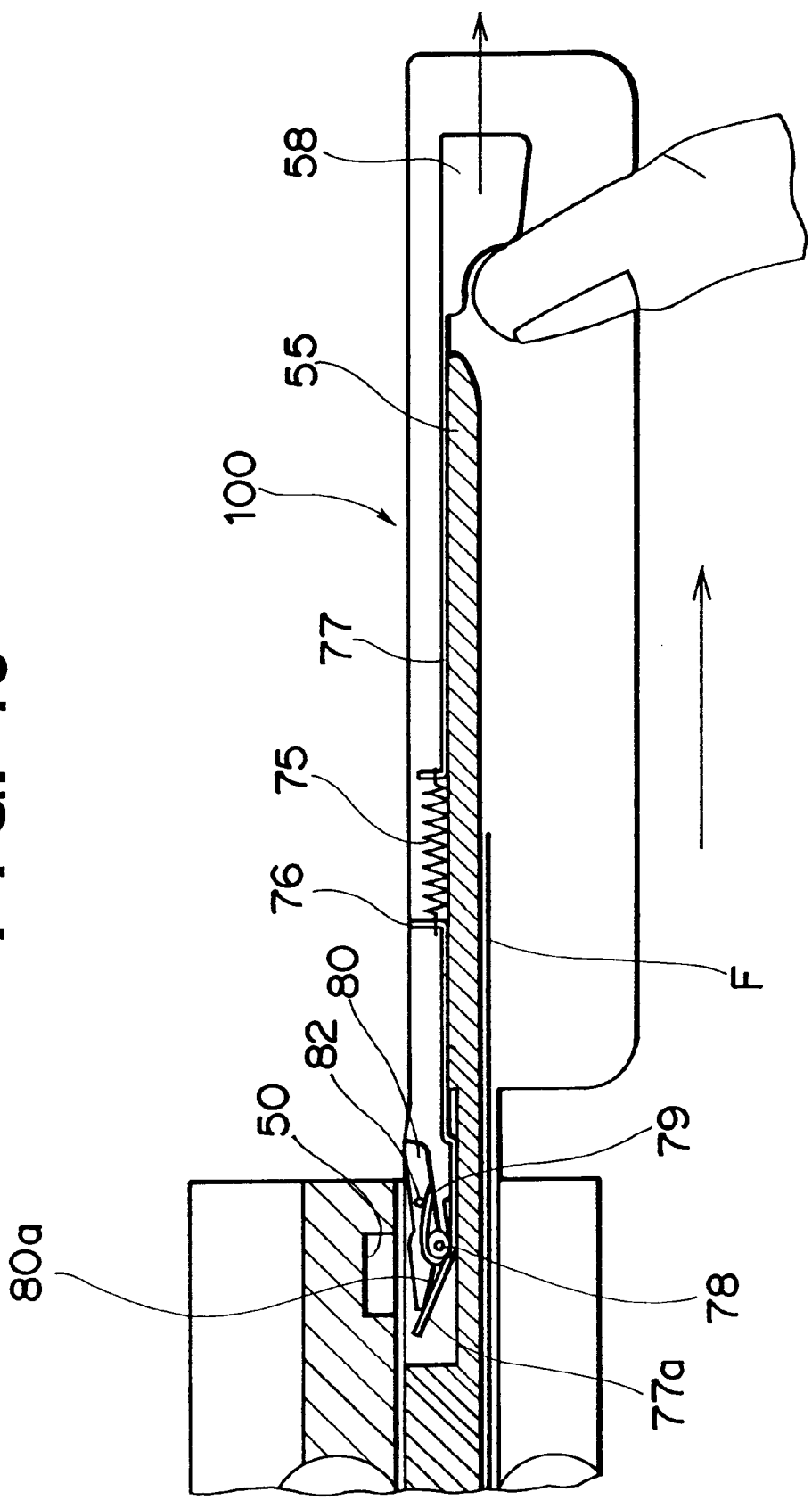
FIG. 10 is a plan view of the continuous film unit 100 in the extracted state.

Next, making reference further to FIG. 10, the base 55 is arranged such that the lever 58 is movable in the left and right directions, and is provided with the plate 77 integrally. The end 77a of this plate 77 operates upon an operating end 80a of a member 80 which is provided rotatably around a pin 78 and also pressed in a counter-clockwise direction by a torsion spring 79, constructed such that the unit 100 is inserted from the right opening 13 shown in FIG. 1 and moved to the predetermined mounting position, whereupon the member 80 engages the recessed portion 50 as shown in FIG. 9.

In order to disengage this engaged state, the operator operates the lever 58 in the right direction, and removes the member 80 from the recessed portion 50.

Figure 11:
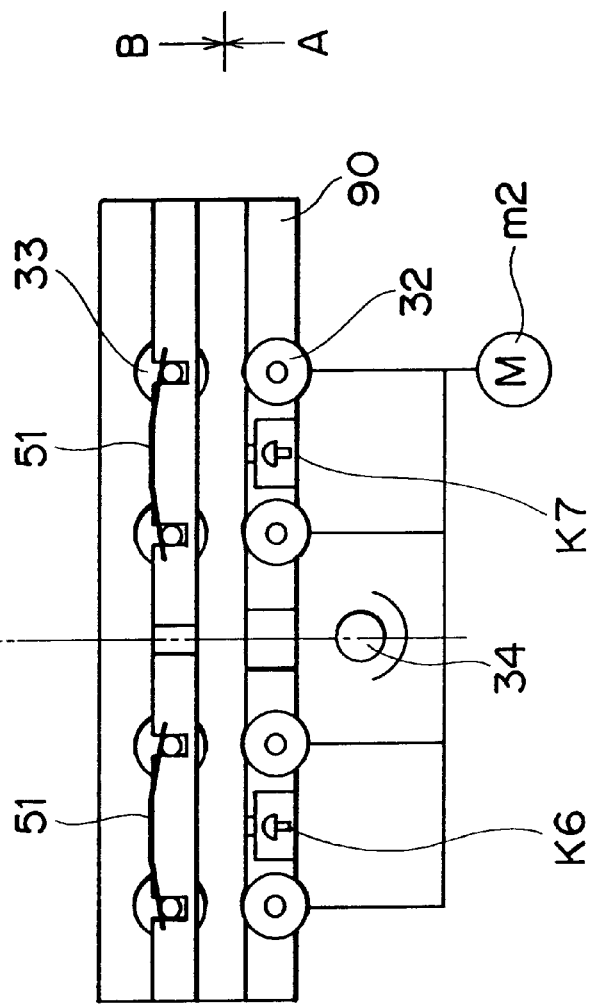
FIG. 11 is a systematic diagram of the film reading unit.
Figure 12:
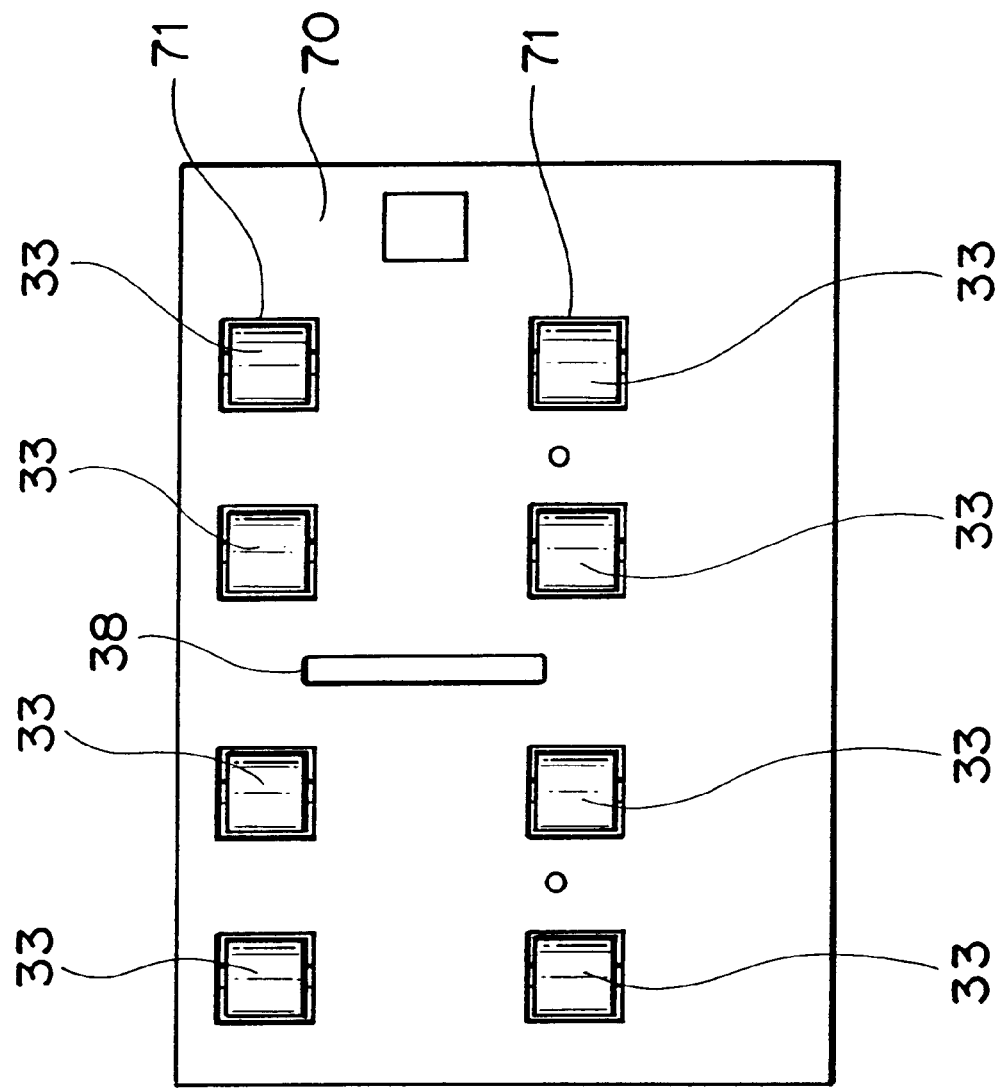
FIG. 12 is a diagram illustrating FIG. 11 from the direction of arrows A—A.

FIG. 11 is a plan view describing the construction of the drive rollers 32 and idle rollers 33. FIG. 12 is a diagram illustrating FIG. 11 from the direction of arrows A—A, and FIG. 13 is a diagram illustrating FIG. 11 from the direction of arrows B-B.

Figure 13:
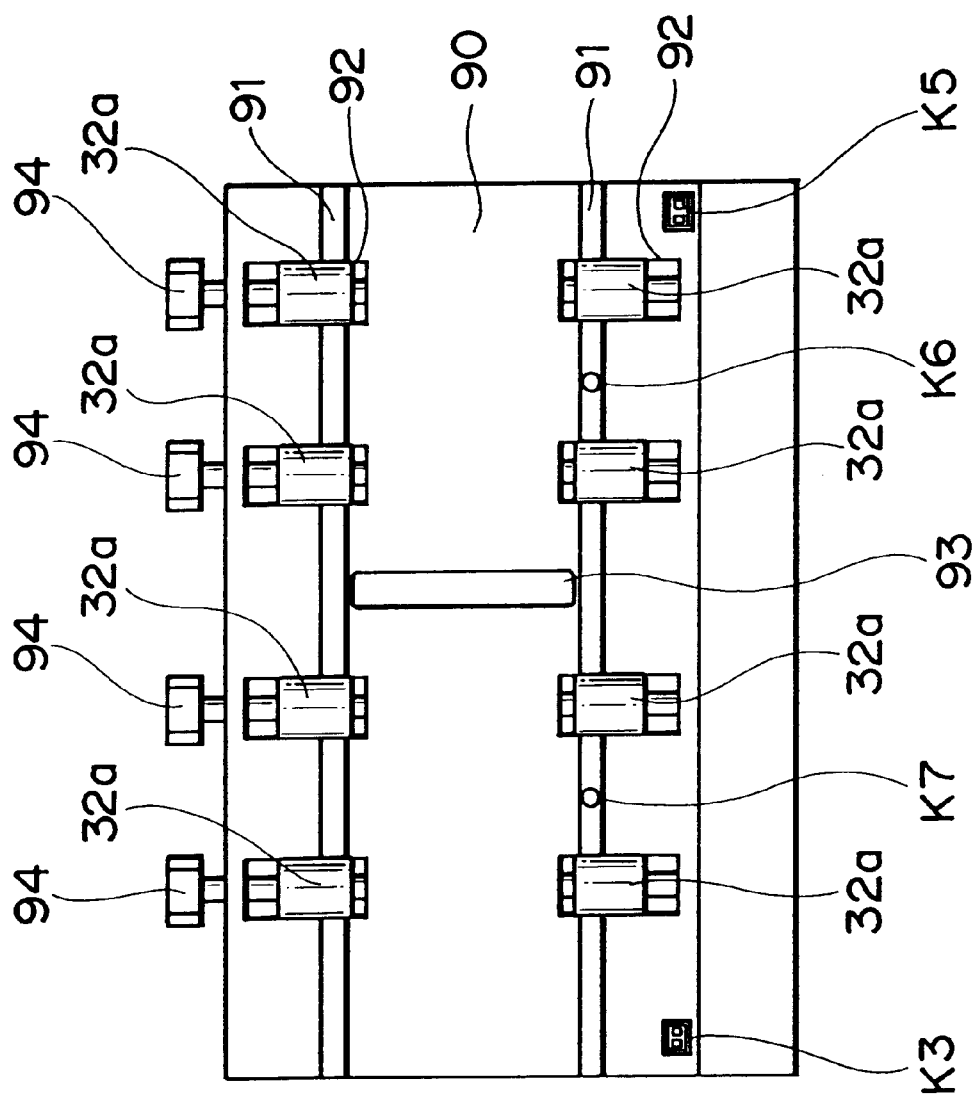
FIG. 13 is a diagram illustrating FIG. 11 from the direction of arrows B—B.

In FIG. 11 and FIG. 13, each of the drive rollers 32 are axially borne in a rotatable manner by the base 90 and each having gears 94 fixed to the ends of the shafts. Also, the elastic member portions 32a protrude from windows opened in the base 90, and the windows are arranged along the protrusions 91 guiding the units 100 and 200, so that the elastic member portions 32a come into contact with the outer plane pair each of the units, thus providing transporting force.

On the other hand, in FIG. 12, the above idle rollers 33 are arranged so as to partly protrude from the windows 71 in the base 70.

Figure 14:
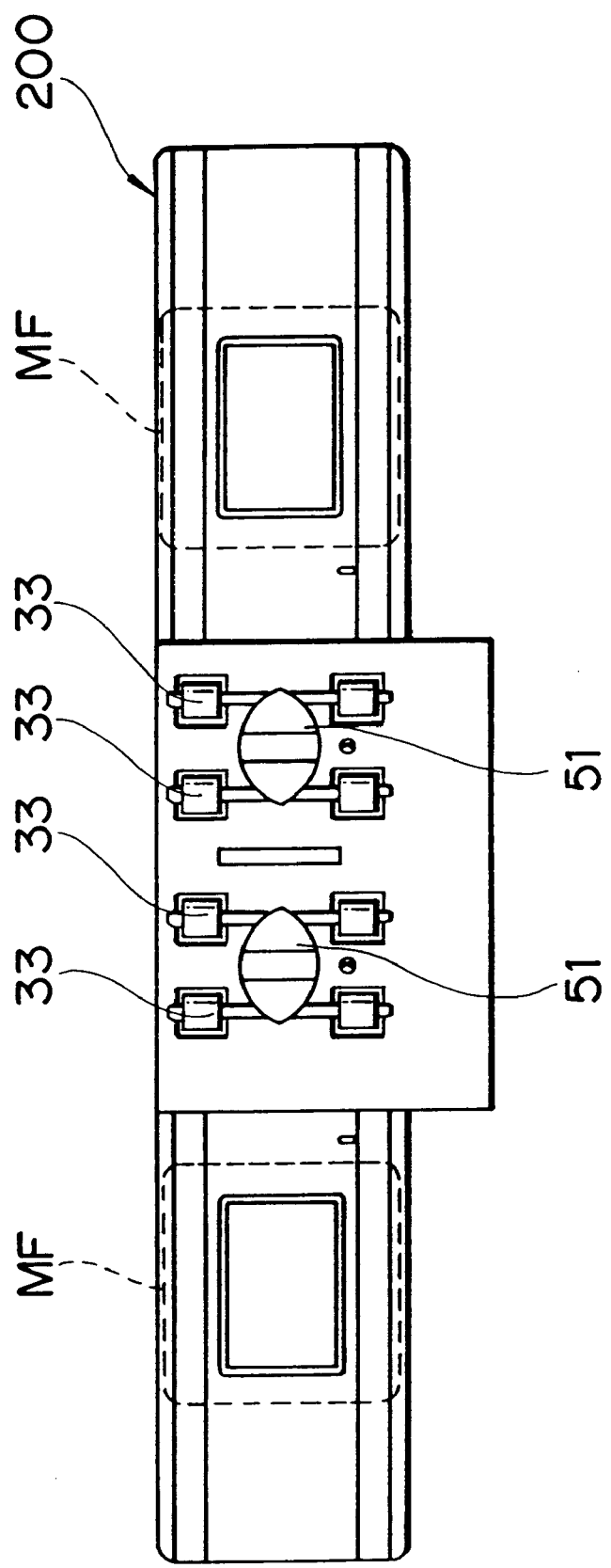
FIG. 14 is a rear view illustrating the film reading unit and slide film unit 200 together.

Also, FIG. 14 is a front view of the device 1 as viewed from the inside outwards, with springs 51 operating on each of the idle rollers 33 as shown in the Figure, and with the idle rollers 33 coming into contact as to the running direction of the slide film unit 200.

Figure 15:
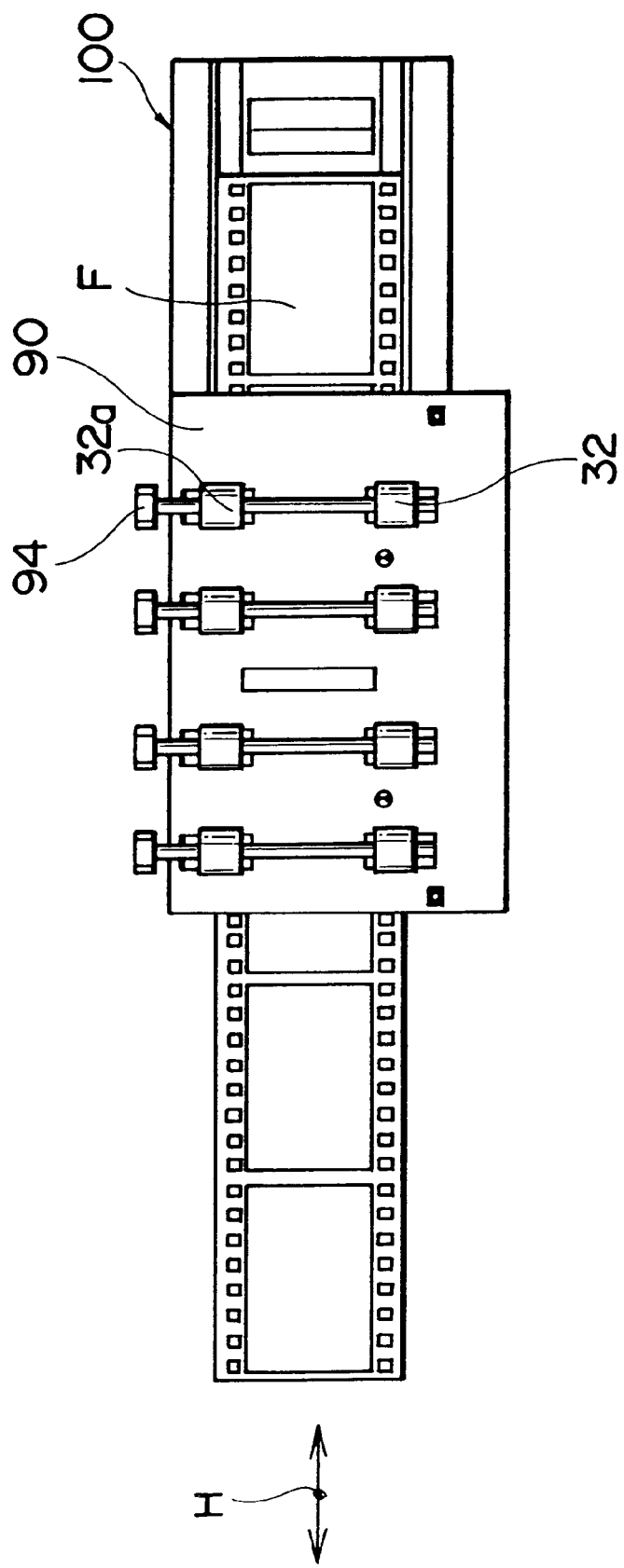
FIG. 15 is a rear view illustrating the film reading unit and continuous film unit 100 together.
Figure 16:
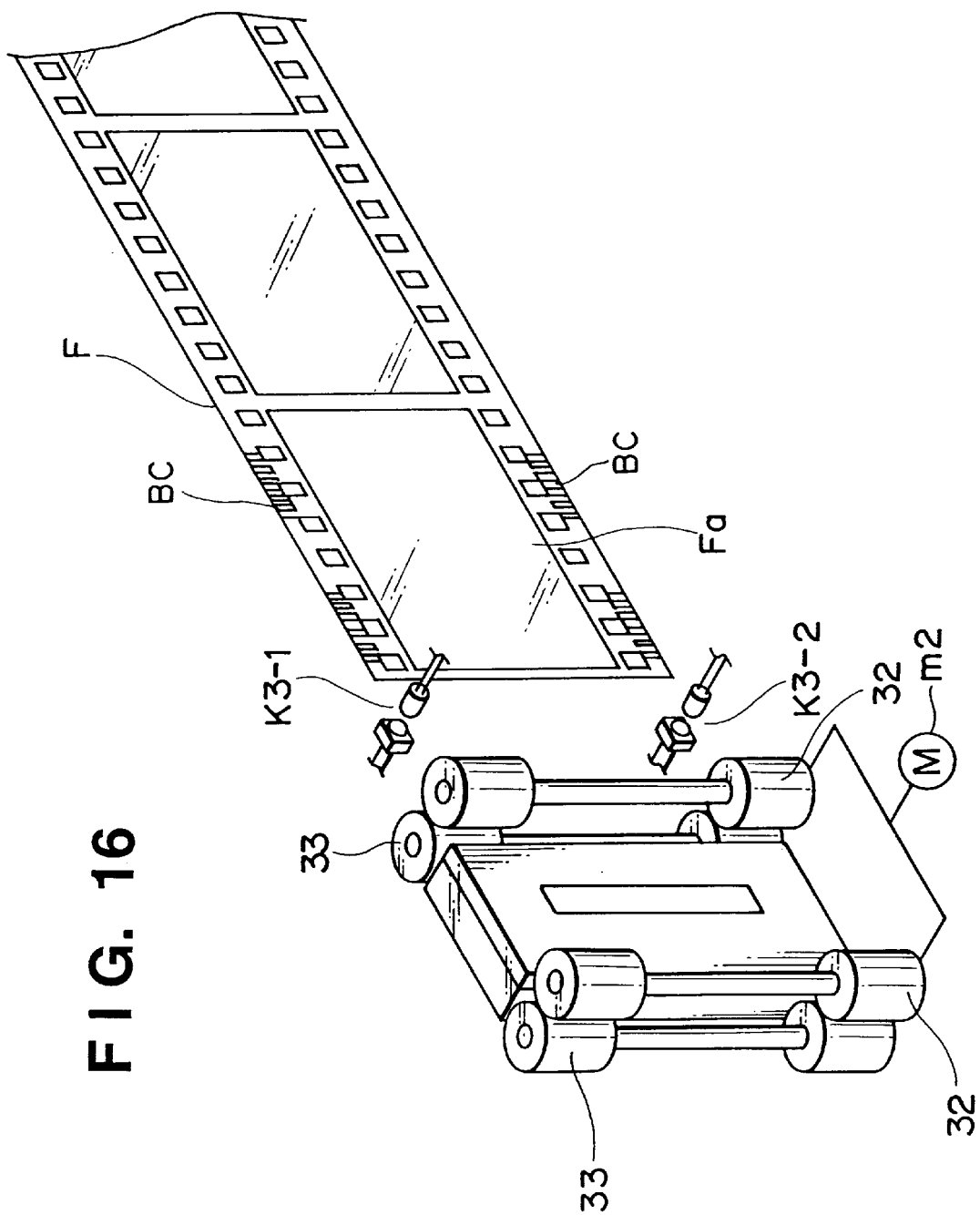
FIG. 16 is an external perspective view illustrating the film reading unit and film F together.

Also, FIG. 15 and FIG. 16 illustrate the state of activation following mounting of the above continuous film unit 100, and is configured in the Figure such that the elastic portion 32a of each of the drive rollers are positioned to the portion with bar-code formation which is the feeding perforation portion of the film F.

Also, the sensor K3 is provided as sensor K3-1 and sensor K3-2 above and below in order to read the above and below bar-codes BC as shown in FIG. 16, so that the top and bottom of the film F can be detected event when the film is setting the unit 100 upside down.

Figure 17A:
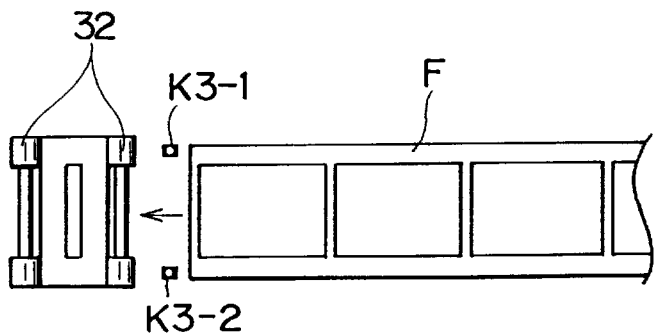
FIGS. 17A through 17E are diagrams for explaining the operation of the film reading units.
Figure 17B:
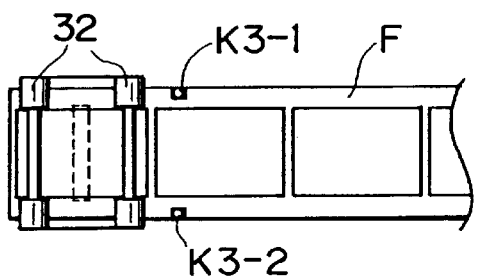

FIGS. 17A through 17E are diagrams for describing the operation of the running state of the film F. In FIGS. 17A and 17B, pre-pre-scanning of the film F is performed, scanning of one line in the vertical direction in the generally center position of the first frame is executed, and automatic focusing is activated so that the contrast is maximal based on this data, filter replacement is performed based on judgment made from the image concentration, focusing of the converging lens and setting of the desired filter is performed, the film is returned in the reverse direction in FIG. 17C, preparation is made for pre-scanning, the entire film is fed in FIG. 17D and pre-scanning is performed, and reverse transporting is made in FIG. 17E to perform main scanning.

[Configuration of the control circuit]

Figure 18:
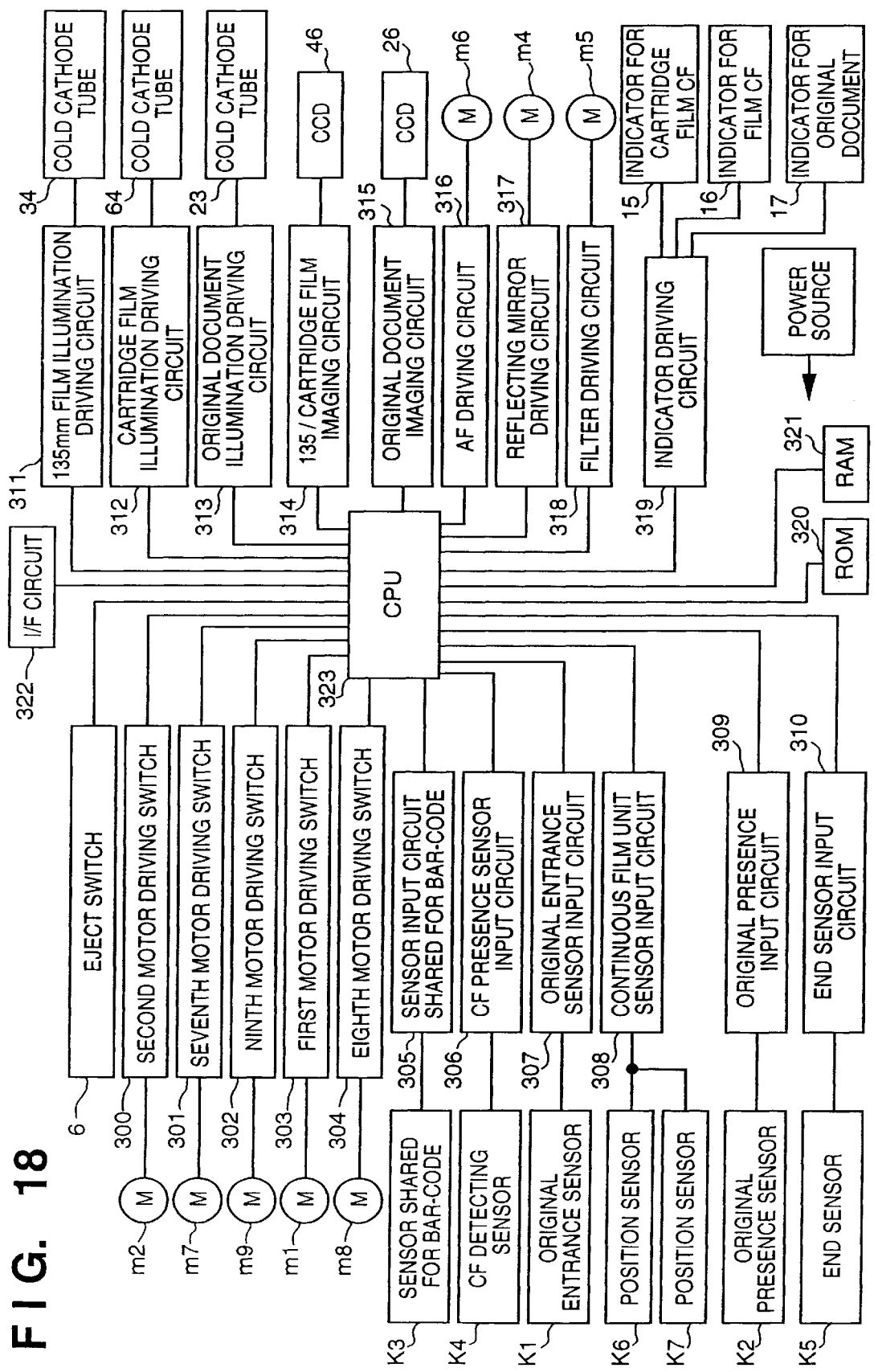
FIG. 18 is a block diagram illustrating the configuration of the control circuitry of the scanner device.

Next, the control circuit of the above-described scanner device will be described. FIG. 18 is a block diagram illustrating the configuration of the control circuitry of the scanner device.

As shown in FIG. 18, the CPU 323 is a controller which handles control of the entire scanner device. The interface (I/F) circuit 322 enables transmission of image data and various types of control data with a personal computer connected with an I/F cable. The ROM 320 is program memory storing control programs to be executed by the CPU 323, and RAM 321 is dynamic memory for storing various types if data (various types of control data, image data, etc.).

As also shown in FIG. 4, the eject switch 6 also serves as an opening/closing switch for the cartridge film mounting unit 11 and a forced ejecting switch for other film or originals, the on/off signal being output to the CPU 323. The second motor driving circuit 300 controls the second motor m2 for scanning the 135 mm film based on control of the CPU 323. The seventh motor driving circuit 301 controls the seventh motor m7 for storing the cartridge film CF within the case, based on control of the CPU 323. The ninth motor driving circuit 302 controls the ninth motor m9 for feeding the cartridge film CF from the case and performing scanning thereof, based on control of the CPU 323. The first motor driving circuit 303 controls the first motor m1 for scanning original documents based on control of the CPU 323. The eighth motor driving circuit 304 controls the eighth motor m8 for inserting and removing the cartridge film mounting unit 11, based on control of the CPU 323.

The sensor input circuit 305 shared for bar-code outputs detection signals of the sensor K3 shared for barcode to the CPU 323. The CF presence sensor input circuit 306 outputs detection signals of the sensor K4 to the CPU 323. The original entrance sensor input circuit 307 outputs detection signals of the original entrance sensor K1 to the CPU 323. The continuous film unit sensor input circuit 308 outputs detection signals of the position sensors K6 and K7 for detecting feeding of the 135 mm film to the CPU 323. The original presence input circuit 309 outputs detection signals of the original presence sensor K2 to the CPU 323. The end sensor input circuit 310 outputs detection signals of the end sensor K5 which detects the end of the continuous film unit 100 to the CPU 323.

The 135 mm film illumination driving circuit 311 performs lighting control of the cold-cathode 34 for irradiating light upon the 135 mm film based on the control data of the CPU 323. The cartridge film illumination driving circuit 312 performs lighting control of the cold-cathode 34 for irradiating light upon the cartridge film CF, based on the control data of the CPU 323. The original document illumination driving circuit 313 performs lighting control of the cold-cathode 23 for irradiating light upon the original document G, based on the control data of the CPU 323.

The 135/cartridge film imaging circuit 314 performs driving control of the line image CCD 46 which converts 135 mm film images and cartridge film images into electrical signals and images the signals, based on the control data of the CPU 323. The original document imaging circuit 315 performs driving control of the line image CCD 26 which converts original document images into electrical signals and images the signals, based on the control data of the CPU 323. The AF (auto-focus) driving circuit 316 performs driving control of the sixth motor m6 for automatic adjustment of the focus of the converging lens by driving the lens barrel 44, based on the control data of the CPU 323. The reflecting mirror driving circuit 317 performs driving control of the fourth motor m4 for driving the reflecting mirror 48, based on the control data of the CPU 323. The filter driving circuit 318 performs driving control of the fifth motor m5 for driving the filters 41, based on the control data of the CPU 323.

The indicator driving circuit 319 lights or blinks an indicator 15 for the cartridge film CF, an indicator 16 for film F, and an indicator 17 for original document G, based on the control data of he CPU 323.

[Description of operation of the scanner device]

Next, description of operation of the scanner device according to the present embodiment will be made.

<First Embodiment>

Figure 19:
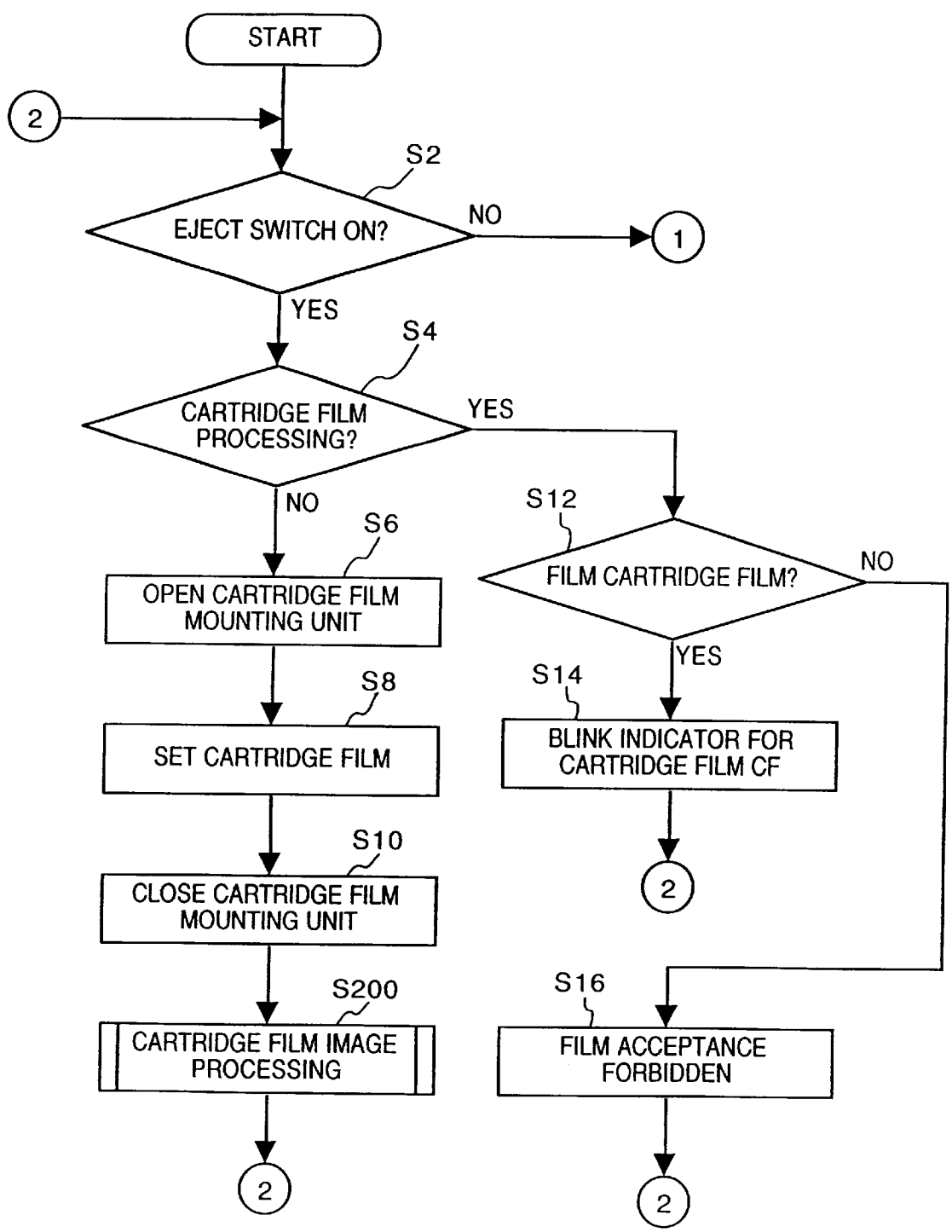
FIG. 19 is a flowchart illustrating the operation of a first embodiment.
Figure 20:
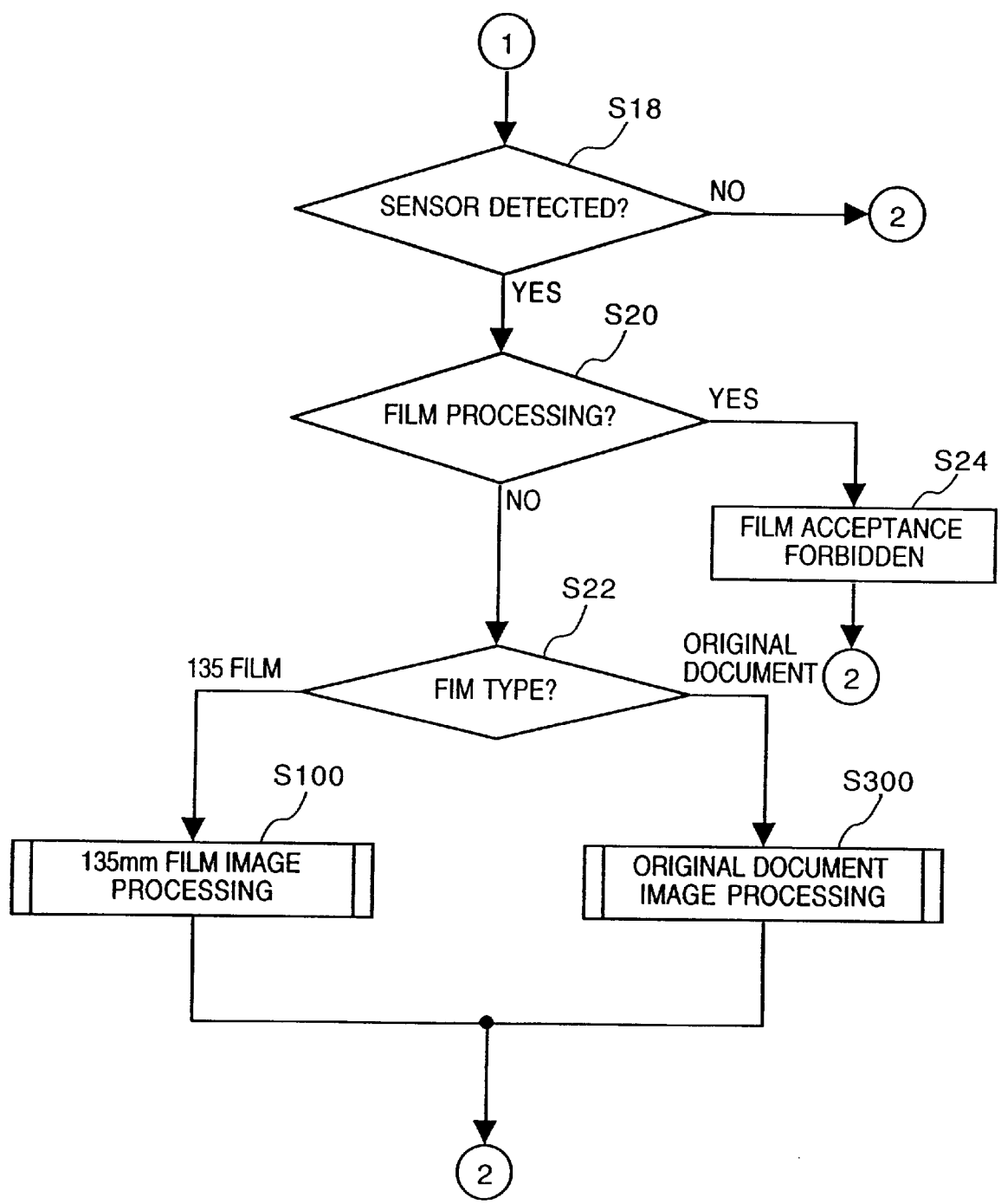
FIG. 20 is another flowchart illustrating the operation of the first embodiment.

First, description will be made regarding a first embodiment according to the present invention. FIG. 19 and FIG. 20 are flowcharts illustrating the operations of the first embodiment.

With the first embodiment, the scanner device is arranged such that, for example, in the event that mounting of the continuous film unit 100 or the slide film unit 200 is attempted for processing 135 mm film while cartridge film CF is being processed, control is made so that mounting of the continuous film unit 100 or the slide film unit 200 is prohibited until processing of the process of cartridge film CF is completed.

Making more specific description, as shown in FIG. 19, in step S2, the CPU judges whether or not the eject switch 6 is on or not. In the event that the eject switch 6 is on in step S2 (Yes in step S2), the flow proceeds to step S4, and in the event that the eject switch 6 is not on in step S2 (No in step S2), the flow proceeds to a later-described step S18.

In step S4, the CPU 323 judges whether any of the film types is being currently processed. Judgment of whether processing of film is being performed or not is made according to the detection signals of the sensor K3 shared for bar-code, the CF present sensor K4, and the original document presence sensor K2. In the event that processing of film is not being performed in step S4 (No in step S4), the flow proceeds to step S6 and sends the cartridge film mounting unit 11 to the open position. The operator mounts the cartridge film CF to the mounting hole 12 in step S8, and the detection signals for the CF detecting sensor K4 are output to the CPU 323. In the case that judgment is made in step S10 that cartridge film CF is present, based on the output signals of the CF detecting sensor K4, the cartridge film mounting unit 11 is stored in the closed position. Subsequently, the flow proceeds to step S200, and executes a later-described sub-routine program for processing the cartridge images.

In the event that processing of film is being performed in step S4 (Yes in step S4), the flow proceeds to step S12 and judges whether or not the film being processed is cartridge film CF or not. In the event that the film being processed in step S12 is cartridge film CF (Yes in step S12), the flow proceeds to step S14 and forbids acceptance of film, and also blinks the red light of the indicator 15 for cartridge film CF to notify the user that cartridge film CF is being processed. In the event that the film being processed in step S12 is not cartridge film CF (No in step S12), the flow proceeds to step S16 and forbids acceptance of any type of film.

Next, as shown in FIG. 20, in the event that the eject switch is not on in step S2 (No in step S2), the flow proceeds to step S18, and makes judgment whether any of film, cartridge film, or original documents have been mounted to the scanner device, based on detection signals of the sensor K3 shared for bar-code, CF presence sensor K4 or original document sensor K2. Now, the sensor K3 shared for bar-code detects mounting of negative film, unmounted positive film, and mounted positive film. In the event that any of the sensors detects mounting in step S18 (Yes in step S18), the flow proceeds to step S20, and in the event that none of the sensors detects mounting in step S18 (No in step S18), the flow returns to step S2.

In step S20, the CPU 323 makes judgment whether any of types of film are being processed. Judgment of whether any of types of film are being processed or not is made based on detection signals of the sensor K3 shared for bar-code, CF presence sensor K4 or original document sensor K2. In the event that film is not being processed in step S20 (No in step S20), the flow proceeds to step S22 and judges the type of film mounted to the scanner device. In the event that 135 mm film F is mounted in step S22, the flow proceeds to step S100, and performs the 135 mm film image processing sub-routine program described in FIG. 24. Also, in the event that an original document G is mounted in step S22, the flow proceeds to step S300, and performs the original document image processing sub-routine program described in FIG. 27.

Next, in the event that there is film being processed in step S20 (Yes in step S20), the flow proceeds to step S24 and forbids acceptance of any type of film.

Hence, according to the first embodiment, the operator can be notified by forbidding processing a one type of film while another is being processed, thereby preventing mistaken operation.

<Second embodiment>

Figure 21:
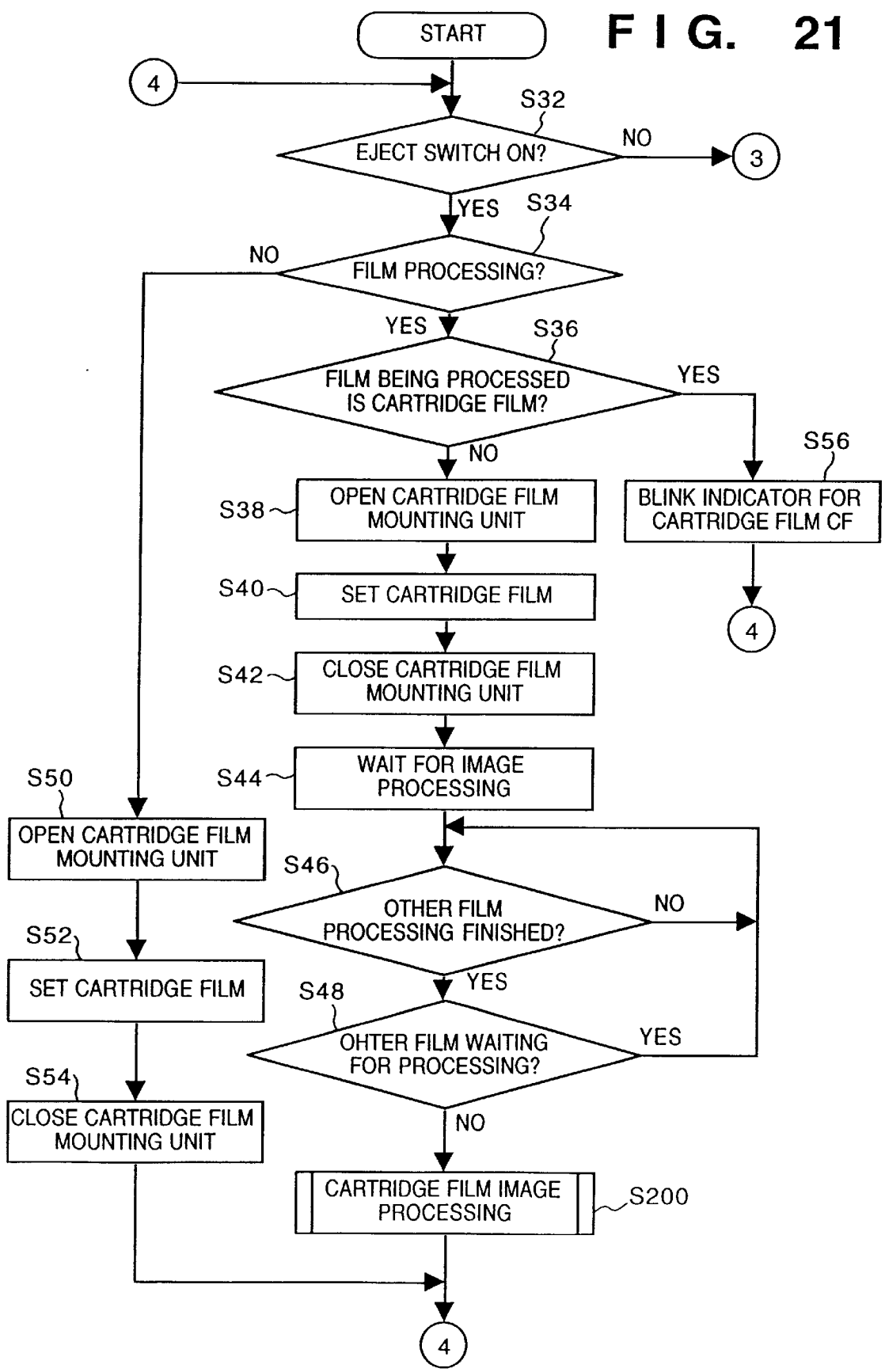
FIG. 21 is a flowchart illustrating the operation of a second embodiment.
Figure 22:
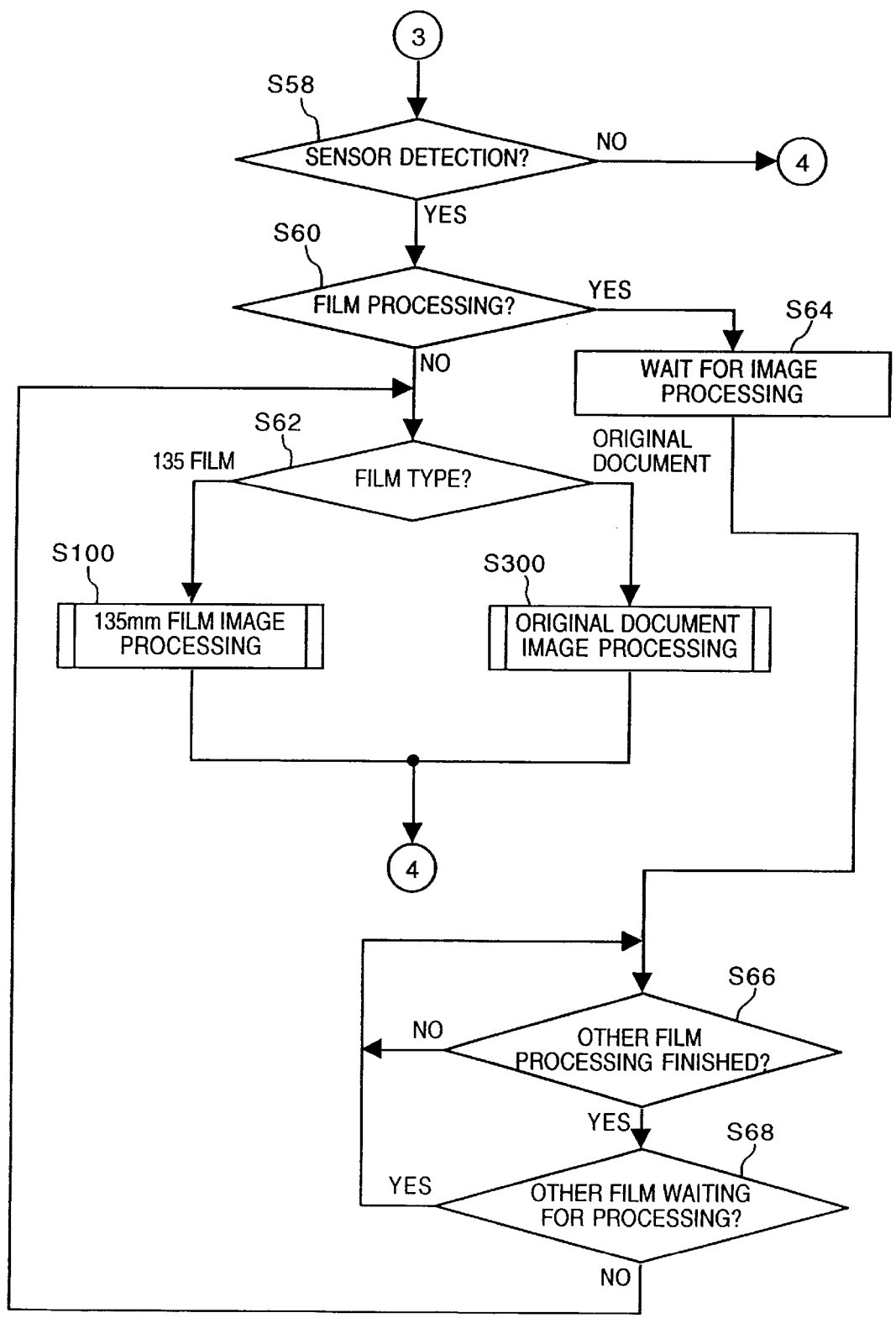
FIG. 22 is another flowchart illustrating the operation of the second embodiment.

Next, description will be made regarding a second embodiment according to the present invention. FIG. 21 and FIG. 22 are flowcharts illustrating the operations of the second embodiment.

With the second embodiment, the scanner device is arranged such that, for example, in the event that mounting of the 135 mm film is attempted while cartridge film CF is being processed, control is made so that the 135 mm film is accepted and image processing preparations are made, and processing of the 135 mm film is conducted following processing of the cartridge film CF being completed. In other words, with the second embodiment, control is performed so that image processing is performed in the order that the 135 mm film F, cartridge film CF or original document G is mounted.

Making more specific description, as shown in FIG. 21, in step S32, the CPU 323 judges whether or not the eject switch 6 is on or not. In the event that the eject switch 6 is on in step S32 (Yes in step S32), the flow proceeds to step S34, and in the event that the eject switch 6 is not on in step S32 (No in step S32), the flow proceeds to a later-described step S58.

In step S34, the CPU 323 judges whether any of the film types is being currently processed. Judgment of whether processing of film is being performed or not is made according to the detection signals of the sensor K3 shared for bar-code, the CF present sensor K4, and the original document presence sensor K2. In the event that processing of film is not being performed in step S34 (No in step S34), the flow proceeds to step S50 and sends the cartridge film mounting unit 11 to the open position. The operator mounts the cartridge film CF to the mounting hole 12 in step S52, and the detection signals of the CF detecting sensor K4 are output to the CPU 323. In the case that judgment is made in step S54 that cartridge film CF is present, based on the output signals of the CF detecting sensor K4, the cartridge film mounting unit 11 is stored in the closed position. Subsequently, the flow proceeds to step S200, and executes a sub-routine program described in FIG. 26 for processing of the cartridge film images.

In the event that processing of film is being performed in step S34 (Yes in step S34), the flow proceeds to step S36 and judges whether or not the film being processed is cartridge film CF or not. In the event that the film being processed in step S36 is cartridge film CF (Yes in step S36), the flow proceeds to step S56 and forbids acceptance of film, and also blinks the red light of the indicator 15 for cartridge film CF to notify the user that cartridge film CF is being processed. In the event that the film being processed in step S36 is not cartridge film CF (No in step S36), the flow proceeds to step S38 and sends the cartridge film mounting unit 11 to the open position. The operator mounts the cartridge film CF to the mounting hole 12 in step S38, and the detection signals of the CF detecting sensor K4 are output to the CPU 323. In the case that judgment is made in step S42 that cartridge film CF is present, based on the output signals of the CF detecting sensor K4, the cartridge film mounting unit 11 is stored in the closed position. Subsequently, in step S44, other film is being processed, so the state is that of waiting for image processing of cartridge film. In this image processing waiting state, the mounted cartridge film is held in the cartridge film mounting unit 11 in the event that it is not in use. In step S46, the CPU 323 waits until the processing of the other film is completed, and when the processing of the other film is completed (Yes in step S46), judgment is made in step S48 whether or not there is other film waiting for processing or not. In the event that there is other film waiting for processing in step S48, (Yes in step S48), the flow returns to step S46 and waits until the processing of the other film is completed. In the event that there is no other film waiting for processing in step S48, (No in step S48), the flow proceeds to step S200, and executes a sub-routine program described in FIG. 26 for processing of the cartridge film images.

Next, as shown in FIG. 22, in the event that the eject switch is not on in step S32 (No in step S32), the flow proceeds to step S58, and makes judgment whether any of film, cartridge film, or original documents have been mounted to the scanner device, based on detection signals of the sensor K3 shared for bar-code, CF presence sensor K4 or original document sensor K2. In the event that any of the sensors detects mounting in step S58 (Yes in step S58), the flow proceeds to step S60, and in the event that none of the sensors detects mounting in step S58 (No in step S58), the flow returns to step S32.

In step S60, the CPU 323 makes judgment whether any of types of film are being processed. Judgment of whether any of types of film are being processed or not is made based on detection signals of the sensor K3 shared for bar-code, CF presence sensor K4 or original document sensor K2. In the event that film is not being processed in step S60 (No in step S60), the flow proceeds to step S62 and judges the type of film mounted to the scanner device. In the event that 135 mm film F is mounted in step S62, the flow proceeds to step S100, and performs the 135 mm film image processing sub-routine program described in FIG. 24. Also, in the event that an original document G is mounted in step S62, the flow proceeds to step S300, and performs the original document image processing sub-routine program described in FIG. 27.

Next, in the event that there is film being processed in step S60 (Yes in step S60), the flow proceeds to step S64, and since other film is being processed, the state is that of waiting for image processing of the 135 mm film or original document. In this image processing waiting state, the mounted the 135 mm film or original document is held in the continuous film unit 100 or the reflective original document reading unit 20 in the event that it is not in use. In step S66, the CPU 323 waits until the processing of the other film is completed, and when the processing of the other film is completed (Yes in step S66), judgment is made in step S68 whether or not there is other film waiting for processing or not. In the event that there is other film waiting for processing in step S68, (Yes in step S68), the flow returns to step S66 and waits until the processing of the other film is completed. In the event that there is no other film waiting for processing in step S68, (No in step S68), the flow proceeds to step S62 and judges the type of film mounted to the scanner device, and executes subsequent processing.

Hence, according to the second embodiment, film is processed in the order that it is mounted, so there is no need to wait for film being processed to finish in order to mount film, meaning that processing efficiency and handiness is improved.

<Third embodiment>

Figure 23:
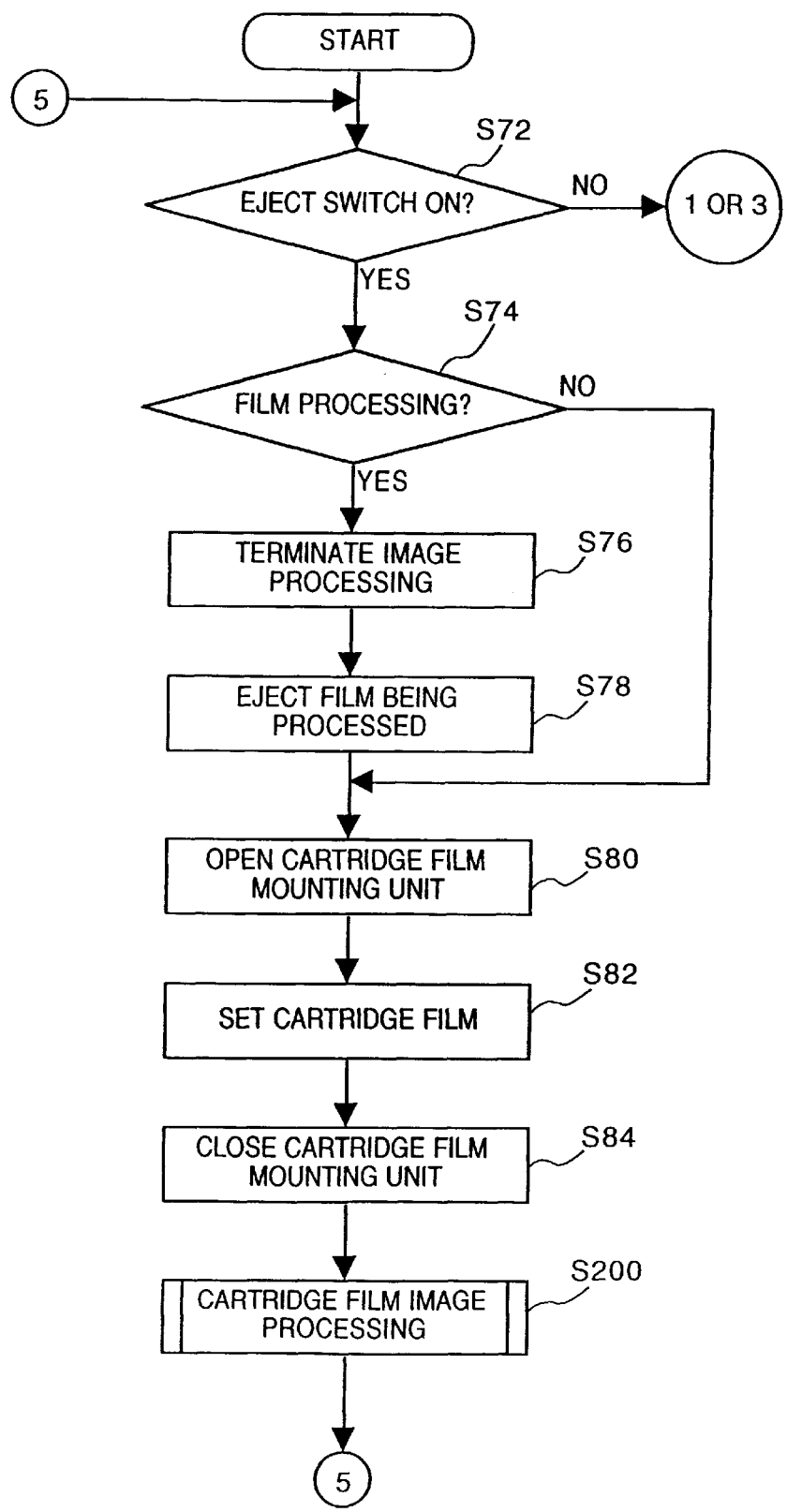
FIG. 23 is a flowchart illustrating the operation of a third embodiment.

Next, description will be made regarding a third embodiment according to the present invention. FIG. 23 is a flowchart illustrating the operations of the third embodiment.

With the third embodiment, the scanner device is arranged such the eject switch 6 serves both for opening and closing the cartridge film mounting unit 11 and forced ejection functions of film being processed. In the event that the operator presses the eject switch 6 during processing of any of the 135 mm film, cartridge film, or original document, the processing is terminated and the film is ejected, or, in the event that there is no film being processed, the cartridge film mounting unit 11 is open/close controlled.

Making more specific description, as shown in FIG. 23, in step S72, the CPU judges whether or not the eject switch 6 is on or not. In the event that the eject switch 6 is on in step S72 (Yes in step S72), the flow proceeds to step S74, and in the event that the eject switch 6 is not on in step S72 (No in step S72), the flow proceeds to either the above-described step S18 or step S58.

In step S74, the CPU 323 judges whether any of the film types is being currently processed. Judgment of whether processing of film is being performed or not is made according to the detection signals of the sensor K3 shared for bar-code, the CF present sensor K4, and the original document presence sensor K2. In the event that processing of film is not being performed in step S74 (No in step S74), the flow proceeds to step S82 and sends the cartridge film mounting unit 11 to the open position. The operator mounts the cartridge film CF to the mounting hole 12 in step S8, and the detection signals of the CF detecting sensor K4 are output to the CPU 323. In the case that judgment is made in step S84 that cartridge film CF is present, based on the output signals of the CF detecting sensor K4, the cartridge film mounting unit 11 is stored in the closed position. Subsequently, the flow proceeds to step S200, and executes a sub-routine program described in FIG. 26 for processing the cartridge film images.

In the event that film is being processed in step S74 (Yes in step S74), the flow proceeds to step S76 and terminates the film image processing that is currently being processed, and ejects the film of which processing has been terminated in step S78. Subsequently, the flow proceeds to step S80, and sends the cartridge film mounting unit 11 to the open position.

Thus, according to the third embodiment, sharing functions of the film opening and closing switch and forced ejection switch simplifies the switching circuitry and reduces costs.

<Image processing operation for 135 mm film>

Figure 24:
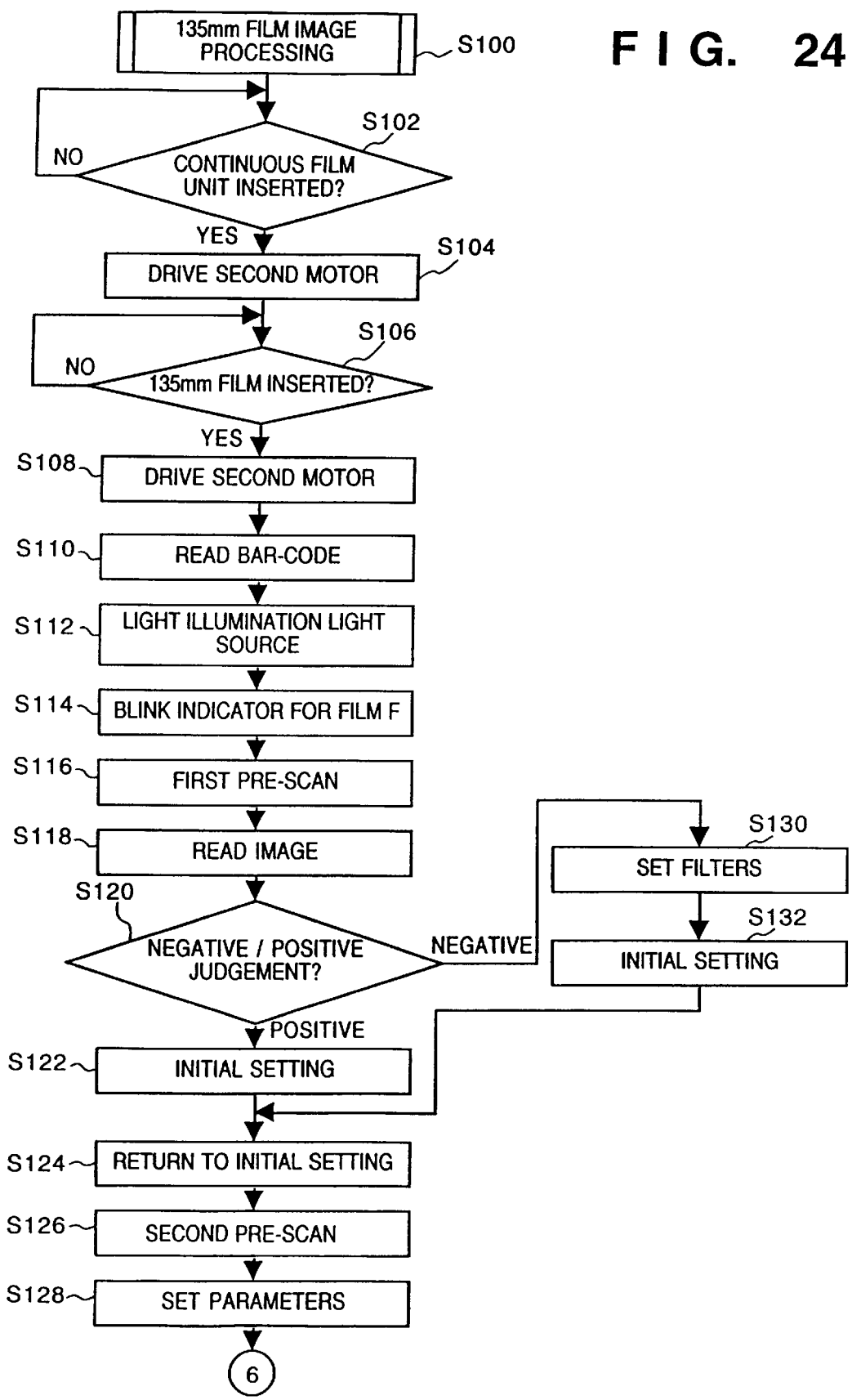
FIG. 24 is a flowchart illustrating the operation of image processing for 135 mm film.
Figure 25:
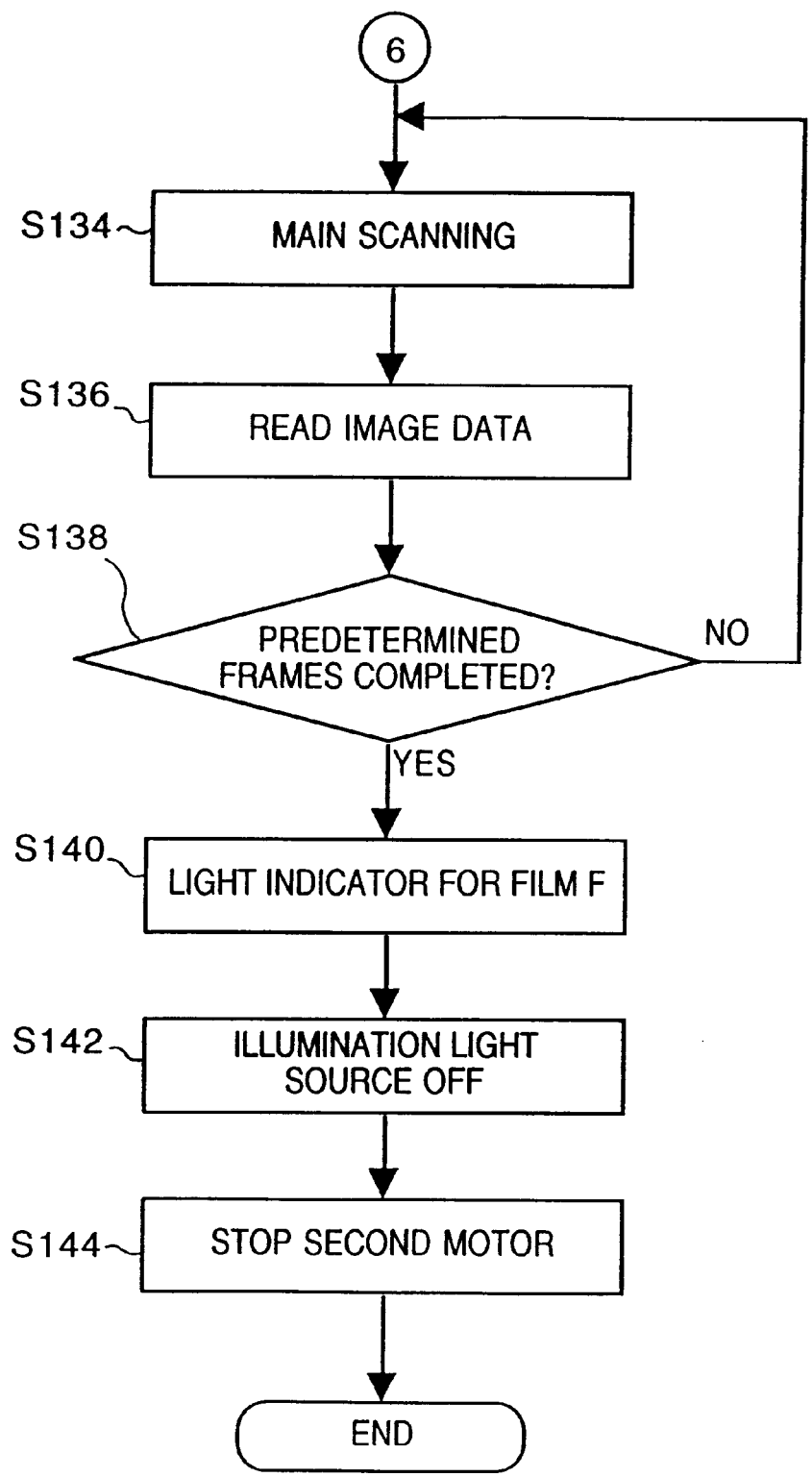
FIG. 25 is another flowchart illustrating the operation of image processing for 135 mm film.

Next, image processing operation of 135 mm film with the scanner device will be described. FIG. 24 and FIG. 25 are flowcharts illustrating this image processing operation of 135 mm film.

With the image processing operation of 135 mm film, the scanner device performs both detection of insertion and reading of the bar-code with the sensor K3 shared for bar-code. The 135 mm film is fed out to around the center of the first frame in the first pre-scan, around the center of the first frame of the 135 mm film is read, and AF processing is executed. Subsequently, the 135 mm film is returned to the original position, all of the frames of the 135 mm film are fed out in the second pre-scan in which the various parameters are set, following which control is performed to read image data from the 135 mm film in the main scan. Incidentally, as shown in FIG. 1, the 135 mm film is developed negative film F, unmounted positive film, and mounted positive film MF.

Specifically, as shown in FIG. 24, in step S102, the CPU 323 waits for the continuous film unit to be mounted. In the event that mounting of the continuous film unit is detected in step S102 (Yes in step S102), the second motor is driven in step S104 and the continuous film unit is driven to the predetermined position. After the continuous film unit is detected by the sensor K3 shared for bar-code, the second motor is driven until detected by the end sensor K5.

In step S106, the flow waits for the 135 mm film to be mounted. Once the sensor K3 shared for bar-code detects mounting of the 135 mm film in step S106 (Yes in step S106)., the second motor is driven in step S108 and is sent to the initial position. In step S110, the bar-code provided to the top and bottom portions of the film is read by the sensor K3 shared for bar-code as the 135 mm film F is fed to the initial position. This bar-code has recorded information such as the film manufacture, ISO value, and so forth.

In step S112, the cold cathode tube which serves as an illumination light source is lit. In step S114, a the indicator 16 for film F blinks green to indicate that film is being scanned. In step S116, the 135 mm film or slide film unit is fed out to around the center of the first frame in the first pre-scan (See FIG. 17(b)), and in step S118, around the center of the first frame of the film is read, and in step S120 judgment is made from the image concentration of the read first frame whether the film is negative or positive film. In the event that the film fed in step S120 is positive film, the flow proceeds to step S122, and executes AF processing as an initial setting. Also, in the event that the film fed in step S120 is negative film, the flow proceeds to step S130, the filter 41 is set, and executes AF processing as an initial setting in step S132. The reason that the filter is set in step S130 is in order to remove the orange color of the negative film.

Figure 17C:
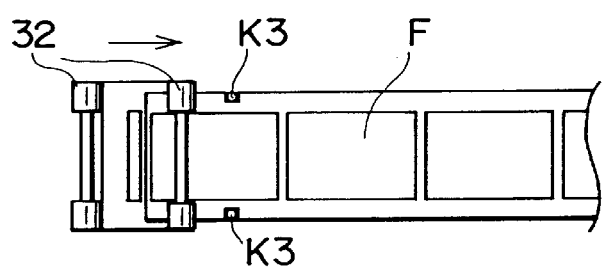
Figure 17D:
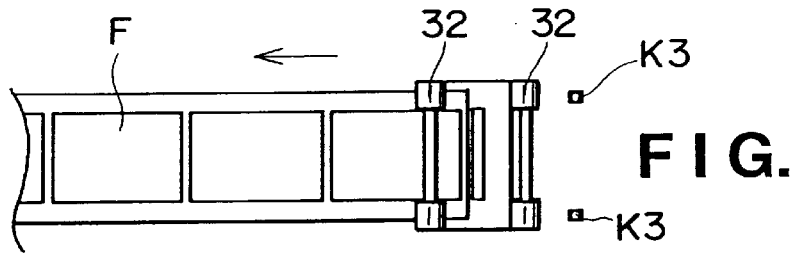

In step S124, the 135 mm film or slide film unit is returned to the initial position (See FIG. 17(c)), and in step S126 all of the frames of the 135 mm film or slide film unit are fed out as a second pre-scan (See FIG. 17(d)), and in step S128, parameters such as brightness of the light source, accumulation time for the CCD, exposure amount such as gain, are set, thereby preparing to read the image.

Figure 17E:
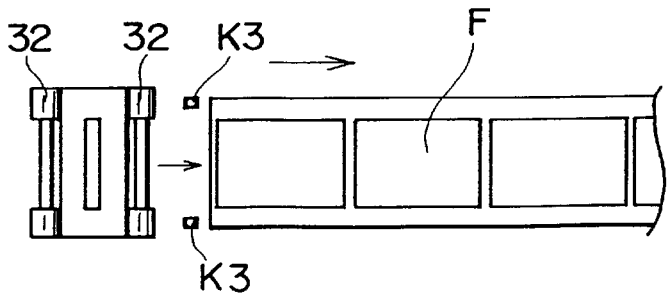

Next, as shown in FIG. 25, in step S134, the second motor is reversed as main scanning and the film is fed in the reverse direction (See FIG. 17(e)), and the image of each frame is read in step S136. In step S138, the processing of steps S134 and S136 is repeated until the images of all frames have been read, and at the point that images of the certain number of frames have been read, the flow proceeds to step S140 and switches the indicator 16 from blinking green to solid green, indicating that image reading has been completed. In step S142, the cold-cathode 34 serving as the light source is turned off, and the second motor is stopped in S144 and image processing of the 135 mm film or positive film is completed.

As described above, the scanner device performs both detection of insertion of the 135 mm film and reading of the bar-code with the sensor K3 shared for bar-code, meaning that the number of sensors can be reduced, simplifying the sensor circuitry and reducing cost.

Also, performing auto-focusing and judging whether the film is negative film or positive film in a first pre-scan using the first frame of the film prior to the second pre-scan for setting film parameters allows for image reading with the film format having been accurately judged.

<Image processing operation of cartridge film>

Figure 26:
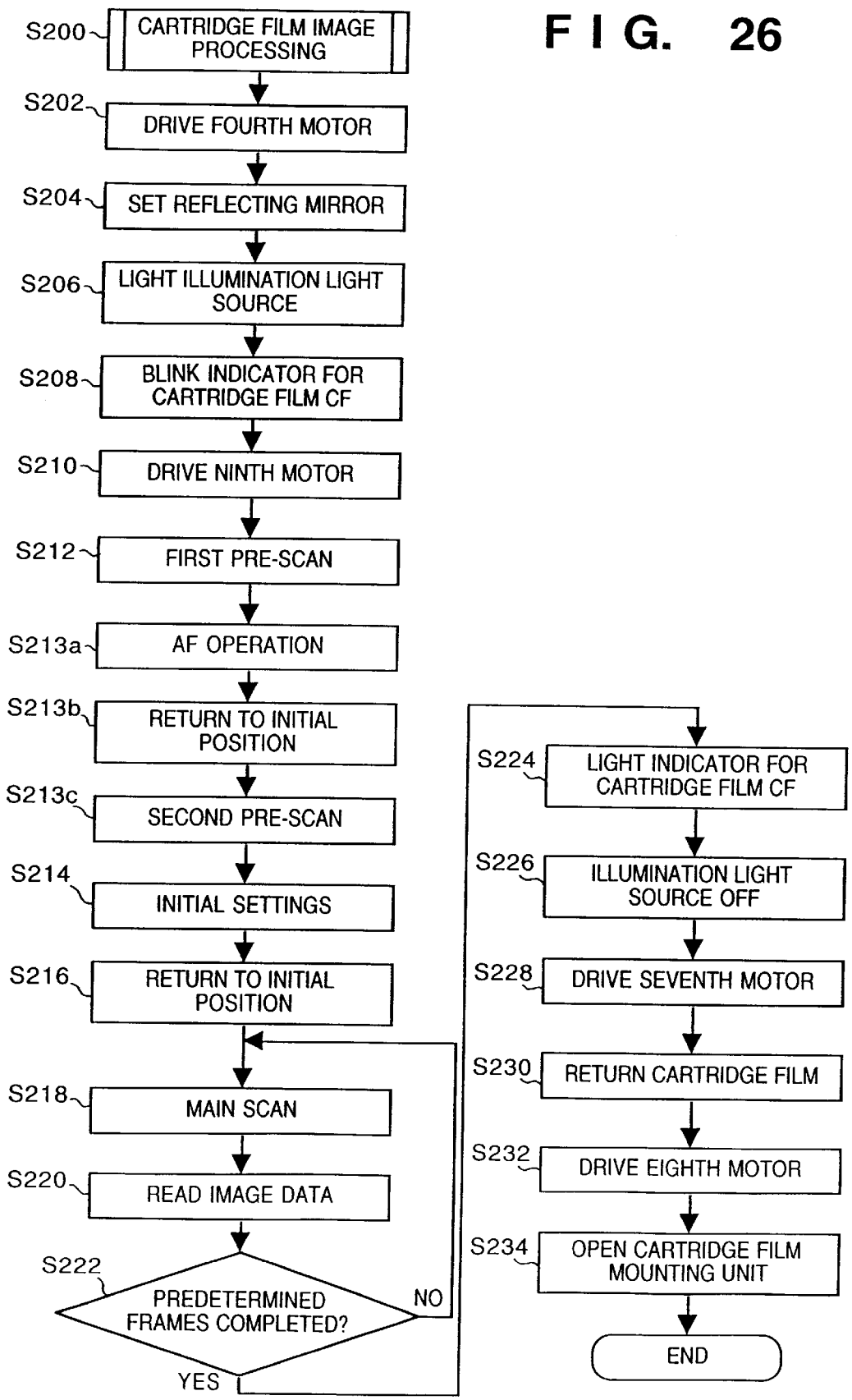
FIG. 26 is a flowchart illustrating the operation of image processing for cartridge film.

Next, the image processing operation of cartridge film will be described. FIG. 26 is a flowchart indicated the image processing operation of cartridge film.

With image processing operation of cartridge film, the scanner device is controlled so as to first feed out all frames of the cartridge film in a pre-scan and perform color correction, and then subsequently read the images from the cartridge film in the main scanning.

Specifically, as shown in FIG. 26, in step S202, the CPU 323 activates the fourth motor, and in step S204 sets the reflecting mirror 48 in the direction of the cartridge film. In step S206, the cold cathode tube 64 which serves as an illumination light source is lit. In step S208, the indicator 15 for cartridge film CF blinks green to indicate that film is being scanned. In step S210, the ninth motor is activated, and in step S212, film is fed out to around the center of the first frame approaches the imaging optical axis as a first pre-scan, and one line of image is read. After executing AF processing with that data in step S213a, the film is rewound to the initial position in step S213b, following which all of the frames are fed out as a second pre-scan and roughly read in step S213c. In step S214, the various parameters are set, thereby preparing to read the image.

Next, in step S216, the cartridge film of which all frames had been fed out is rewound to original position. In step S218, the cartridge film is fed out again for main scanning, and the image of the certain frames is read in step S220. In step S222, the processing of steps S218 and S220 is repeated until the images of all frames have been read, and at the point that images of the certain number of frames have been read, the flow proceeds to step S224 and switches the indicator 15 for cartridge film CF from blinking green to solid green, indicating that image reading has been completed. In step S226, the cold-cathode 64 serving as the light source is turned off, and the seventh motor is driven in steps S228 and S230 to rewind the cartridge film, and the eighth motor is driven in steps S232 and S234 to move the cartridge film mounting unit 11 to the open position, thus completing image processing of the cartridge film.

<Image processing operation of original documents>

Figure 27:
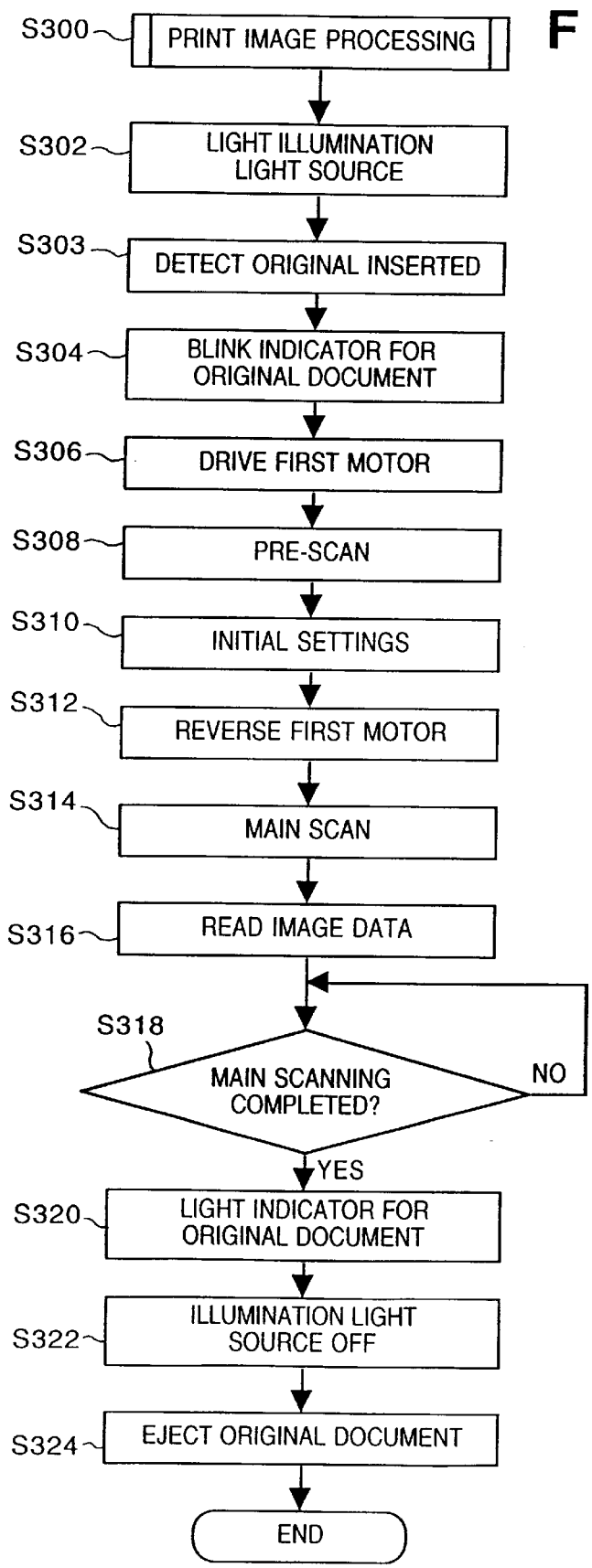
FIG. 27 is a flowchart illustrating the operation of image processing for original documents.

Next, the image processing operation of original documents will be described. FIG. 27 is a flowchart indicated the image processing operation of original documents.

With image processing operation of original documents, the scanner device is controlled so as to first feed out the entire original document in a pre-scan and perform color correction, and then subsequently read the image from the original document in the main scanning.

Specifically, as shown in FIG. 27, in step S302, the CPU 323 lights the cold cathode tube 23 which serves as an illumination light source. Upon the sensor K1 detecting insertion of the original document in step S303, the indicator 17 for original document G blinks green in step S304 to indicate that an original document is being scanned. In step S306, the first motor is activated, and in step S308, the entire original document is fed out as a pre-scan, and in step S310, the various parameters are set, thereby preparing to read the image.

Next, in step S312, the first motor is reversed, main scanning is performed in step S314, and the entire image of the original document is read in step S316. The flow waits in step S318 until the main scanning is completed, and once the main scanning is completed, the flow proceeds to step S320 and switches the indicator 17 for original document G from blinking green to solid green, indicating that image reading of the original document has been completed. In step S322, the cold-cathode 23 serving as the light source is turned off, and the first motor is reverse-driven in step S324 to return the original document to the original document insertion/ejecting opening, thus completing image processing of the original document.

[Image input system]

Next, the image input system using the scanner device according to the present embodiment will be described in detail.

Incidentally, although the present embodiment is arranged so as to be a system with the scanner device and a host computer directly connected, by the present invention is by no means limited to such, rather, the present invention may be carried out in an arrangement connected to an appropriate network.

Figure 28:
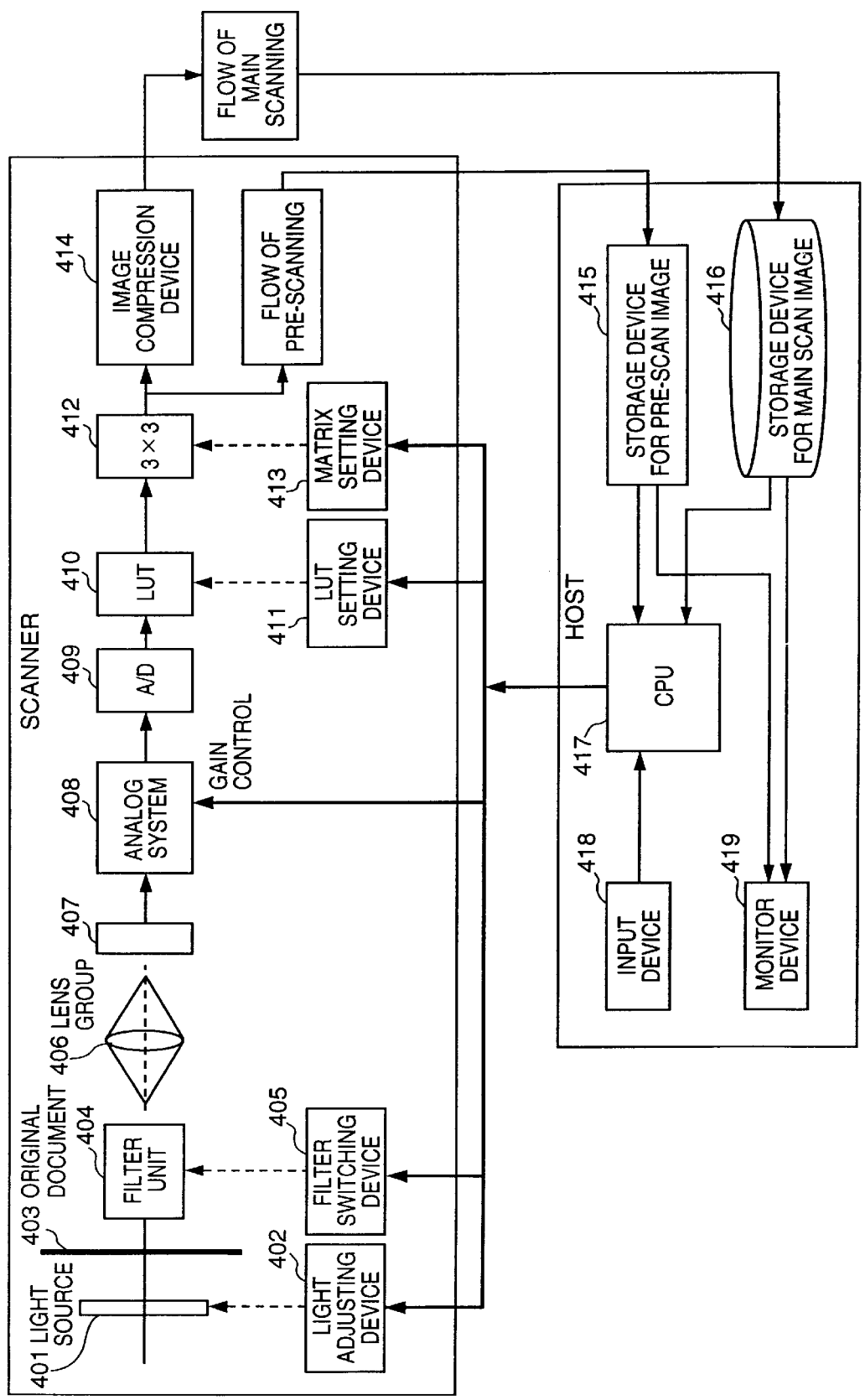
FIG. 28 is a block diagram illustrating the configuration of the image input system according to the embodiments.

FIG. 28 is a block diagram illustrating the configuration of an image input system according to an embodiment of the present invention.

In FIG. 28, reference numeral 401 denotes a light source, and the luminous quantity thereof (intensity of light) can be changed by a light-adjusting device 402. Reference numeral 403 denotes an original document. 404 denotes a filter unit including and ND filter for adjusting the luminous quantity reaching the CCD and a filter for canceling the negative base inserted at the time of scanning the negative film, and 405 denotes a filter switching device. 406 denotes a lens group, and transmitted light from the original document 403 is converged. 407 denotes an RGB tri-color separation system CCD which converts transmitted light from the original document into electrical signals. 408 denotes an analog system which electrically provides offset and gain to the electrical signals obtained from the CCD 407, and 409 denotes an A/D converter. 410 denotes a digital conversion table for converting the digital signal into other digital signal, and 411 is a device for setting the table 410. 412 is a color space conversion matrix, and 413 denotes a matrix setting device for setting the matrix. 414 is an image compressing device. 415 and 416 are storage devices for storing the pre-scan image and main scan image, respectively. 417 denotes a CPU which controls the various components. 418 is an input device such as a keyboard, and 419 is a monitor.

Figure 29:
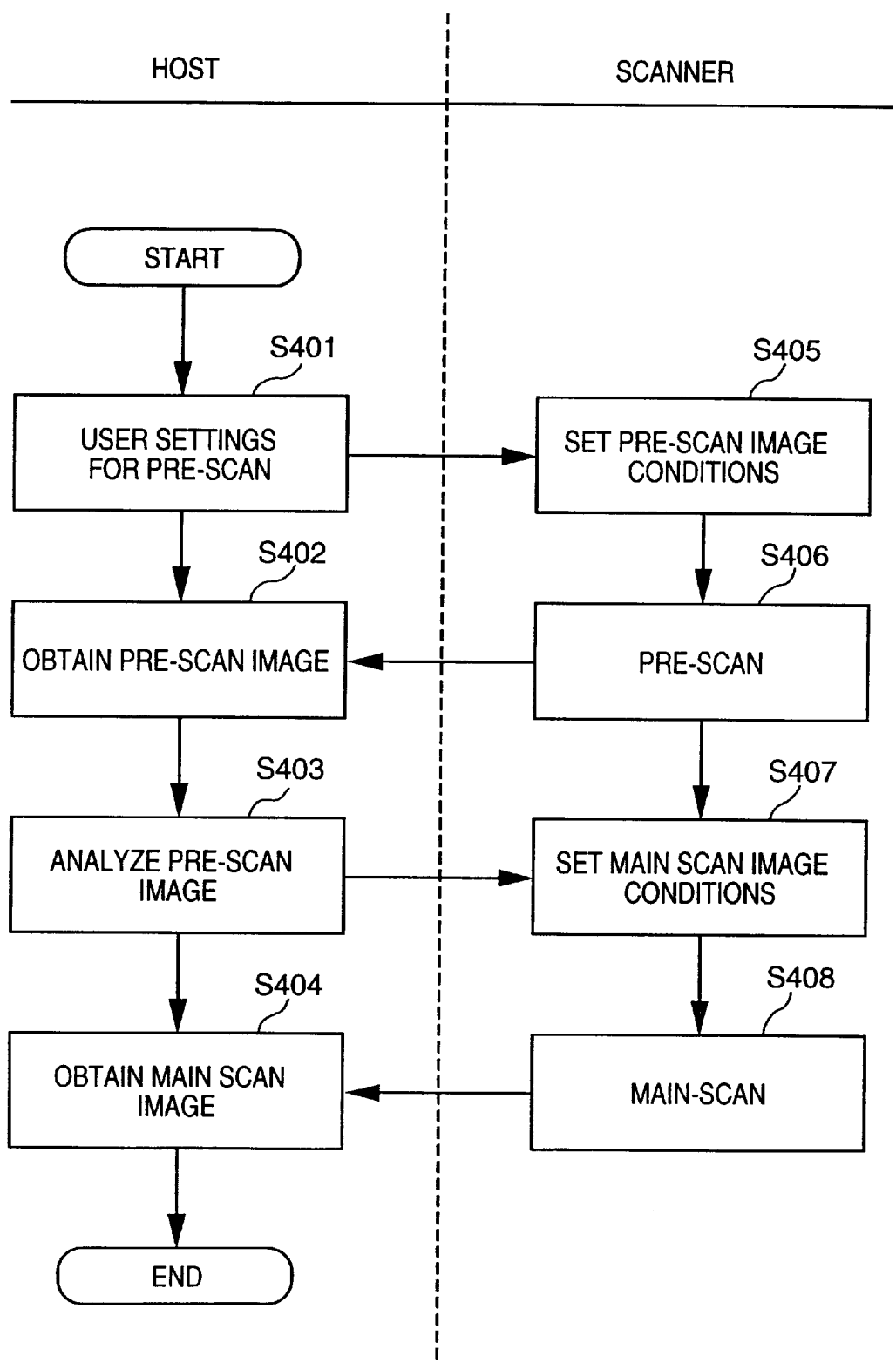
FIG. 29 is a diagram illustrating the commands between the host and scanner device, and the relation in processing.

Next, the flow of processing at each component will be described with reference to FIG. 28 and FIG. 29.

First, the scanning of the image is begun by the user giving instruction to start. In step S401 in FIG. 29, the user inputs the type of film from the input device 418 shown in FIG. 28. Accordingly, the host computer instructs the scanner to set the conditions for pre-scanning, and the scanner sets the conditions (step S405). The conditions at this time are unique to the type of film, and condition settings of the light-adjusting device 402, filter switching device 405, and analog system 408, all in FIG. 28, are set.

The pre-scan is performed at a lower resolution than that of the main scan (step S406). The analog signals obtained from the above set conditions are converted into digital signals by the A/D converter 409, and further converted by the digital signal conversion table 410. The pre-scan image thus obtained is stored in the pre-scan image storage device 415 of the host computer (step S402), and displayed on the monitor 419 as a preview.

The CPU 417 creates a histogram from the pre-scan image data, and calculates characteristics such as the average concentration of the film, concentration distribution, and so forth (step S403). Then, based on these analysis results, the light-adjusting device 402, filter switching device 405, LUT setting device 411, and matrix setting device 413 are set, in order to set the luminous quantity of the light source, filter, LUT, and color space conversion matrix (step S407).

Incidentally, separate LUT for pre-scanning and main scanning are prepared for the LUT setting device 411.

Now, with main scanning conditions set as described above, the main scanning is performed (step S408). The light which transmits the filter unit 404 is converted into electrical signals at the CCD 407, and the flow through A/D conversion by the A/D converter 409 is the same as with pre-scanning. Subsequently, following digital signal conversion by the LUT 410 prepared for the main scan, the digital signals pass through a color space converting matrix 412 and then compression is performed by the image compressing device 414, and then is stored in the main scan image storage device 416 in the host computer (step S404)

Figure 30:
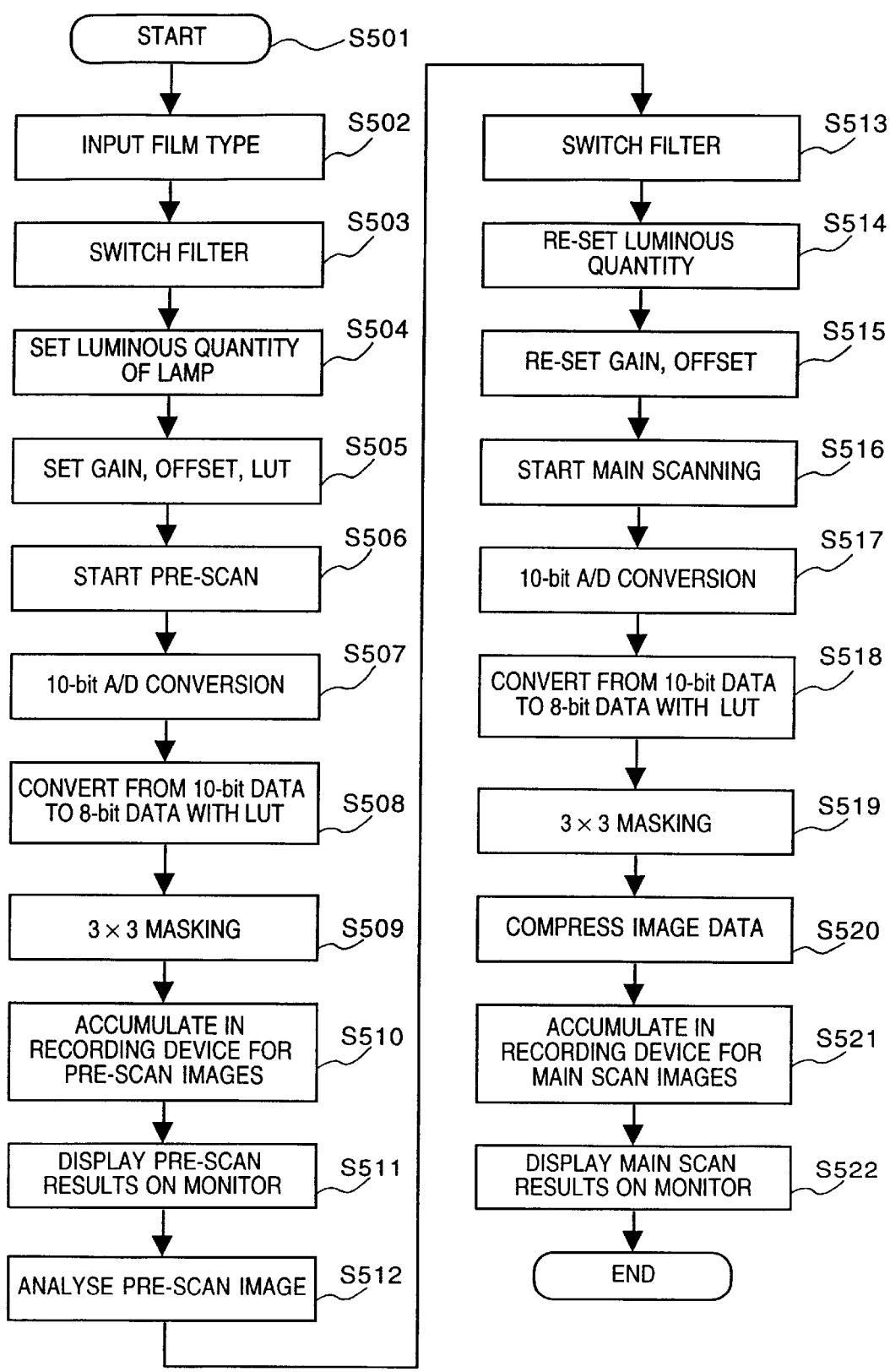
FIG. 30 is a flowchart illustrating the operation of the image input system according to the embodiments.

FIG. 30 is a diagram illustrating the flow of processing with the overall image input system. This processing is performed by the CPU 417 of the host computer.

In FIG. 30, at the point that processing is started, in step S501, the electric power is turned on and the software is started up on the host computer.

In step S502, the type of film is selected manually from a film list displayed in a film type input window of the software.

In step S503, the filter is selected at the filter unit 404 by means of the filter switching device 405, according to the film type selected in step S502.

In step S504, the luminous quantity of the light source 401 is determined by the light-adjusting device 402, according to the type of film selected in step S502.

In step S505, the mount of gain and the amount of offset is set in the analog system, 408, according to the type of film selected in step S502. Also, the pre-scan LUT is selected by the LUT setting device 411, and set to the LUT 410.

In step S506, pre-scanning is started under the conditions set in steps S503 through S505.

In step S507 the CCD output reaches a certain voltage level according to the set gain and offset, and is A/D converted into 10-bit data.

In step S508, 10-bit data is converted to 8-bit data by referring the LUT 410. γ conversion is also performed at the same time.

In step S509, color correction masking calculation by 3× 3 matrix is performed.

In step S510, the pre-scan image data is stored in the storage device 415 in the host computer.

In step S511, the pre-scanning results are displayed on the monitor.

In step S512, the pre-scanning results are analyzed, and the characteristics of the original image are extracted.

In step S513, the ND filter is switched according to the characteristics of the original (filter unit 404, filter switching device 405).

In step S514, re-adjusting of the luminous quantity of the light source is performed according to the characteristics of the original (light source 401, light-adjusting device 402).

In step S515, the amount of gain is re-adjusted according to the original, and the amount of offset is re-adjusted so that the output of the CCD 407 becomes zero with light shielded (analog system 408). Also, the LUT for main scanning is selected from the LUT setting device 411, and set to the LUT 410.

In step S516, main scanning is started under the above conditions.

In steps S517 through S519, the process the same as steps S507 through S509 are carried out.

In step S520, the main scan image data is compressed.

In step S521, the compressed data is stored in the storage device 416 in the host computer. In step S522, the results of the main scan are displayed on the monitor device 419.

Next, operation of the members 401 through 410 in FIG. 28 will be described in detail, with reference to FIG. 31A through 31D.

First, when performing pre-scanning, the type of film to be scanned is input by the user using the input device 418. The CPU 417 of the host computer takes this information, and sets the brightness of the light source 401 and a combination of filters of the filter unit 404, using the light-adjusting device 402 and filter switching device 405, to the value determined beforehand for pre-scanning according to the type of film, and setting of the electrical gain in the analog system 408 and digital signal conversion table 410 is conducted. The pre-scan image obtained under such conditions are analyzed by the host computer, and the main scanning condition, settings of the CCD-reaching light amount and electrical gain and so forth of which the analog signals match the A/D conversion range, are determined. Hence, the host computer sets up the scanner for the main scan. Next, description will be made regarding the main scan.

The luminous quantity reaching the CCD is adjusted so as to match the A/D conversion range to a certain extent, by the luminous quantity of the light source and the filter conditions. For example, in the event that the CCD output voltage cannot be made to match the A/D conversion range just by adjustment of the light source or an electrical amplification, insertion of an ND filter amplifies the output voltage of the CCD 7, and allows for dealing with a wider concentration range.

As shown in FIG. 31A through FIG. 31D, in order to match the CCD output voltage from the portion with lightest concentration of the concentration area of the original document to be obtained with the upper end of the A/D conversion range, electrical gain adjustment is performed in the analog system 408. Offset adjustment is performed so that the CCD output voltage is zero when shielded from light, and signals are amplified with this as a reference. The CCD output voltage obtained in the state of each part being adjusted is A/D converted by the A/D conversion device 409. For example, considering the case of A/D conversion at 10-bit, the digital count of the lightest portion of the original document is 1023, and the count decreases toward the darker side from thereof. However, since the output voltage of the CCD 407 has been set to be zero in the shielded state, the portion with the darkest concentration on the original document does not necessarily match the bottom end 0 of the 10-bit digital count. This is matched when re-mapping on a digital signal conversion table (FIG. 31D). How far from the bottom of the 10-bit digital count data is to be subjected to re-mapping is determined by the results of analyzing the pre-scan image.

As described above, according to the present embodiment, the concentration area of the original document to be obtained can be matched with the A/D conversion range and the number of bits used for A/D conversion can be used effectively.

Further, a method can be used wherein the upper end of the output data is adjusted by electrical amplification factor and the lower end is determined by a digital signal conversion table, so the upper end and the lower end of the digital signal can be controlled independently, meaning that adjustment is simple.

Also, greater freedom in controlling y properties can be obtained by making the number of bits of the A/D conversion to be greater than the number of output bits obtained by digital signal conversion.

Also, signals can be made to match the A/D conversion range without increasing noise to a wider concentration area on the original document, by having filter insertion means.

Also, increased noise can be suppressed and freely controlled according to a wide range on the original document concentration, by means of having light adjustment means for the light source, electrical amplification factor changing means, and filtering means.

Also, processing from the pre-scan to the main scan can be automated by having means for determining the amount of adjustment of the adjustment items, based on analysis of the pre-scan.

Also, there are few setting items, and setting is easy.

As described above, according to the present embodiment, at the time of reading an image from a film of a certain format while scanning the film of the certain format, reading part of the film of the certain format, setting first conditions for reading means, reading the image on the film of the certain format under the first conditions, setting second conditions for reading means, and reading the image on the film of the certain format under the second conditions, in order to read a portion of the image on the film before pre-scanning, allows for accurate adjustment of the focal distance and color correction of the film before pre-scanning.

[Other Embodiments]

Incidentally, the present invention may be applied to a system comprised of a plurality of devices (e.g., host computer, interface equipment, reader, printer, etc.), or to a free-standing device (e.g., photocopier, facsimile device, etc.).

Also, it is needless to say that it is an object of the present invention to provide to system or devices a recording medium in which a software program code for realizing the aforementioned functions of the embodiment, so that the functions are realized by the computer (or CPU or MPU) of the system or device reading and executing the program code stored in the storage medium.

In this case, the program code itself read from the recording medium realizes the functions of the embodiment, and thus the storage medium storing the program code comprises the present invention.

Types of storage medium for supplying the computer code include but are not limited to: e.g., floppy disks, hard disks, optical discs, optical-magnetic disks, CD-ROM, CD-R, magnetic tape, non-volatile memory cards, ROM, and so forth.

Also, executing the program code read by a computer not only realizes the above-described functions of the embodiment, but it is needless to say that the present embodiment also encompasses cases in which an operating system or the like operating on the computer performs part or all of the actual processing and the above-described functions of the embodiment are realized as the result of such processing.

Further, it is needless to say that the present embodiment also encompasses cases in which the program code read from the storage medium is read into memory relating to a function expansion board or to a function expansion unit connected to the computer, following which a CPU or the like provided to the function expansion board or function expansion unit performs part or all of the actual processing based on the instruction of the program code and the above-described functions of the embodiment are realized as the result of such processing.

In the case of applying the present invention to the above storage medium, the storage medium will store program code corresponding to the above-described flowcharts.

What is claimed is:

1. A control method for a scanner device which has reading means for reading an original image while performing relative scanning of said original image, said control method comprising the following steps:

a first scanning step for reading a portion of the original image in order to detect an attribution of said original image;

a second scanning step for reading the original image under a condition corresponding to the detected attribution and setting an exposure adjusting condition for reading the original image; and a third scanning step for reading the original image under the exposure adjusting condition set in the second scanning step.

2. A control method for a scanner device according to claim 1, wherein in said first scanning step, only the generally center portion of the first frame of said original image is read.

3. A control method for a scanner device according to claim 2, wherein in said first scanning step, the concentration of the image is detected from the first frame of said original image, thus judging whether or not said original image is a negative film or a positive film.

4. A control method for a scanner device according to claim 2, wherein in said first scanning step, the focal distance from the first frame of said original image is set as the condition corresponding to the detected attribution.

5. A control method for a scanner device according to claim 3, wherein in said first scanning step, the focal distance from the first frame of said original image is set as the condition corresponding to the detected attribution.

6. A control method for a scanner device according to claim 1, wherein in said second scanning step, parameters relating to exposure from said original image are set as the exposure adjusting condition.

7. A control method for a scanner device according to claim 3, wherein in the event that said original image is judged to be negative film in said first scanning step, a certain filter is set to perform color correction.

8. A control method for a scanner device according to claim 1, wherein said original image is developed 135 mm film.

9. A scanner device which has reading means for reading an original image while performing relative scanning of said original image, said scanner device comprising:

first scanning means for reading a portion of the original image in order to detect an attribution of said original image;

second scanning means for reading the original image under a condition corresponding to the detected attribution and setting an exposure adjusting condition for reading the original image;

third scanning means for reading the original image under the exposure adjusting condition set by the second scanning means; and control means for controlling said first, second and third feeding means to operate sequentially.

10. Computer-readable memory storing program code for controlling a scanner device which has reading means for reading an original image while performing relative scanning of said original image, said computer-readable memory comprising:

code for a first scanning step for reading a portion of the original image in order to detect an attribution of said original image;

code for a second scanning step for reading the original image under a condition corresponding to the detected attribution and setting an exposure adjusting condition for reading the original image;

code for a third scanning step for reading the original image under the exposure adjusting condition set in the second scanning step; and code for a control step for controlling said first, second and third scanning steps to operate sequentially.

\* \* \* \* \*

UNITED STATES PATENT AND TRADEMARK OFFICE
CERTIFICATE OF CORRECTION

PATENT NO.    : 6,233,059 B1
DATED         : May 15, 2001
INVENTOR(S)   : Takanori Kodaira and Yohei Izumi It is certified that error appears in the above-identified patent and that said Letters Patent is hereby corrected as shown below:

<u>Column 14,</u>
Line 58, please delete "ml", and insert therefor -- m1 --.

<u>Column 23,</u>
Line 39, please delete "y", and insert therefor -- $\gamma$ --.

Signed and Sealed this

Twelfth Day of March, 2002

Attest:

JAMES E. ROGAN
Attesting Officer    Director of the United States Patent and Trademark Office